(12) United States Patent
Mashiro

(10) Patent No.: US 10,018,335 B2
(45) Date of Patent: Jul. 10, 2018

(54) STACK UNIT FOR SIGNAL INDICATOR LAMP, AND SIGNAL INDICATOR LAMP

(71) Applicant: PATLITE CORPORATION, Osaka (JP)

(72) Inventor: Kazuki Mashiro, Osaka (JP)

(73) Assignee: PATLITE CORPORATION, Osaka (JP)

( * ) Notice: Subject to any disclaimer, the term of this patent is extended or adjusted under 35 U.S.C. 154(b) by 0 days.

(21) Appl. No.: 15/506,629

(22) PCT Filed: Dec. 28, 2015

(86) PCT No.: PCT/JP2015/086545
§ 371 (c)(1),
(2) Date: Feb. 24, 2017

(87) PCT Pub. No.: WO2017/115428
PCT Pub. Date: Jul. 6, 2017

(65) Prior Publication Data
US 2018/0106467 A1    Apr. 19, 2018

(51) Int. Cl.
*G08B 5/00* (2006.01)
*F21V 21/005* (2006.01)
*F21V 5/04* (2006.01)
*G08B 5/36* (2006.01)
(Continued)

(52) U.S. Cl.
CPC .............. *F21V 21/005* (2013.01); *F21V 5/04* (2013.01); *F21V 23/06* (2013.01); *G08B 5/36* (2013.01); *G02B 6/0075* (2013.01)

(58) Field of Classification Search
CPC .... F21V 21/005; F21V 23/06; H05B 37/0281
USPC ................ 340/815.4, 815.49, 815.5, 815.55; 362/308, 329, 353, 551, 558
See application file for complete search history.

(56) References Cited

U.S. PATENT DOCUMENTS

2004/0085763 A1* 5/2004 Tsao ........................ F21L 14/04
                                                              362/227
2006/0044814 A1* 3/2006 Ikeda ...................... F21S 8/083
                                                              362/382
(Continued)

FOREIGN PATENT DOCUMENTS

EP    2911476 A1    8/2015
JP    H03-069804 U    7/1991
(Continued)

*Primary Examiner* — Tai T Nguyen
(74) *Attorney, Agent, or Firm* — Rabin & Berdo, P.C.

(57) ABSTRACT

A stack unit is provided for a signal indicator lamp including a plurality of such stack units stacked in a stacking direction. The stack unit includes an outer member, an inner member provided in a first internal space of the outer member, a support portion provided on the outer member, a board held in a second internal space of the inner member, and a first connector and a second connector for external electrical connection. The support portion supports the inner member so that the inner member is rotatable relative to the outer member about a rotation axis extending in the stacking direction and immovable relative to the outer member in the stacking direction. The first connector is provided at one end of the board with respect to the stacking direction, and the second connector is provided at an other end of the board.

20 Claims, 17 Drawing Sheets

(51) Int. Cl.
 *F21V 23/06* (2006.01)
 *F21V 8/00* (2006.01)

(56) References Cited

U.S. PATENT DOCUMENTS

2012/0205331 A1* 8/2012 Stejskal ................. F21V 35/00
 211/60.1
2015/0001972 A1 1/2015 Miyama et al.
2015/0198316 A1 7/2015 Feller et al.

FOREIGN PATENT DOCUMENTS

| | | |
|---|---|---|
| JP | H04-123701 A | 4/1992 |
| JP | H06-031604 Y2 | 8/1994 |
| JP | 2004-186091 A | 7/2004 |
| JP | 2007-128774 A | 5/2007 |
| JP | 2008-181896 A | 8/2008 |
| WO | WO-2013/118670 A1 | 8/2013 |

* cited by examiner

STACK UNIT FOR SIGNAL INDICATOR LAMP, AND SIGNAL INDICATOR LAMP

TECHNICAL FIELD

The present invention relates to a stack unit for a signal indicator lamp, and a signal indicator lamp including the stack unit.

BACKGROUND ART

A signal indicator lamp proposed in the following PTL 1 includes a plurality of display units connected to each other in stacked relation. The display units each have a tubular globe defining the outer shape thereof, and a plurality of internal components disposed in the globe. The internal components include a holder, a circuit board provided with a light source, a plurality of power supply members each made of an elongated metal plate, and a plurality of support portions. The holder is a tubular column having an axis extending vertically as coinciding with the center axis of the globe. The holder holds the circuit board at its upper end. The circuit board is held perpendicularly to the center axis of the globe. The holder has a plurality of holder holes arranged circumferentially thereof about the axis thereof. The power supply members are respectively press-inserted in the holder holes. The support portions are arranged circumferentially of the globe, and extend radially inward from an inner periphery of the globe to support the holder.

When the display unit is to be assembled, the holder is combined with the globe with the circuit board not mounted therein. After the circuit board is mounted in the holder, the power supply members are respectively press-inserted into the holder holes of the holder. After the press insertion, terminals respectively provided at upper ends of the power supply members project from the circuit board. The terminals are soldered to the circuit board.

The terminals of the power supply members projecting upward from the circuit board of one of two adjacent display units are respectively brought into press contact with terminals provided at lower ends of the power supply members of the other display unit within the holder holes. Thus, the power supply members of the one display unit are respectively electrically connected to the power supply members of the other display unit.

CITATION LIST

Patent Literature

PTL 1: JP2007-128774A

SUMMARY OF INVENTION

Technical Problem

In PTL 1, the dedicated power supply members are required for the electrical connection between the adjacent display units. This increases the costs of the display unit. The display unit employing the plurality of power supply members has a complicated construction associated with the power supply members, and includes a greater number of components. Therefore, the assembling of the display unit is time-consuming. Particularly, the step of manually soldering each of the power supply members to the circuit board is time-consuming.

In view of the foregoing, the present invention provides a stack unit which ensures easy assembling and cost reduction, and a signal indicator lamp including the stack unit.

Solution to Problem

According to the present invention, there is provided a stack unit (4) for a signal indicator lamp (1) including a plurality of such stack units stacked in a predetermined stacking direction (X), the stack unit (4) including: an outer member (10) having a first internal space (15) and a pair of first openings (16) through which the first internal space is open to opposite sides defined with respect to the stacking direction; a connection portion (17) provided on the outer member for connecting the outer member to another stack unit of the signal indicator lamp by rotating the outer member about a rotation axis (J) extending in the stacking direction; an inner member (11) provided in the first internal space and having a second internal space (32) and a pair of second openings (33) through which the second internal space is open to the opposite sides defined with respect to the stacking direction; a support portion (20) provided on the outer member for supporting the inner member so that the inner member is rotatable relative to the outer member about the rotation axis and immovable relative to the outer member in the stacking direction; a board (12) having a pair of parallel major surfaces (60) and held in the second internal space by the inner member with the major surfaces extending in the stacking direction; a first connector (65) provided at an end (12B) of the board on one of the opposite sides defined with respect to the stacking direction for external electrical connection; and a second connector (66) provided at an end (12C) of the board on the other side defined with respect to the stacking direction for external electrical connection.

The parenthesized alphanumeric characters in this section correspond to reference characters of respective components in embodiments to be described later, but are not intended to limit the scope of the present invention.

With the aforementioned arrangement, the stack units stacked in the stacking direction to provide the signal indicator lamp each include the outer member, the inner member provided in the first internal space of the outer member, and the board held in the second internal space of the inner member. Thus, the stack units each have a simplified construction including a reduced number of components.

The external electrical connection of the board is achieved via the first connector provided at the one-side end of the board defined with respect to the stacking direction and the second connector provided at the other-side end of the board defined with respect to the stacking direction. More specifically, the electrical connection between adjacent stack units is achieved by connecting the second connector of one of the stack units to the first connector of the other stack unit.

General purpose connectors may be used as the first connector and the second connector. This reduces the costs of the stack unit. The first connector and the second connector may be preliminarily attached to the board. That is, the board, the first connector and the second connector can be handled as a unitary component in assembling the stack unit. This simplifies the construction of the stack unit, and facilitates the assembling of the stack unit.

The support portion provided on the outer member supports the inner member. The inner member is rotatable relative to the outer member about the rotation axis extending in the stacking direction, and immovable relative to the outer member in the stacking direction. Therefore, when the outer members of the adjacent stack units are rotated about the rotation axis to connect the stack units together via the connection portions of the outer members or disconnect the stack units from each other, the rotation of the outer members is not transmitted to the inner members which respectively hold the boards. Thus, even if the boards of the adjacent stack units are connected to each other via the first connector and the second connector provided thereon to thereby restrict the rotation of the inner members, the boards are prevented from being twisted due to the rotation of the outer members.

According to one embodiment of the present invention, the outer member and the inner member of the stack unit are light-transmissive, and the stack unit further includes a light source (68) provided on the major surfaces of the board.

With this arrangement, light emitted from the light source is transmitted through the inner member and the outer member to be outputted to the outside of the stack unit. Thus, the stack unit functions as a display unit for providing predetermined information by outputting the light.

According to another embodiment of the present invention, the inner member is a hollow cylindrical member having a center axis defined by the rotation axis, and the board is offset from the rotation axis in a direction (S) perpendicular to the rotation axis.

With this arrangement, a room can be provided in a position overlapping with the rotation axis in the second internal space of the hollow cylindrical inner member in which the board is held.

According to further another embodiment of the present invention, at least one of the first connector and the second connector is located in a position overlapping with the rotation axis in the second internal space.

With this arrangement, the room provided in the position overlapping with the rotation axis in the second internal space can be effectively utilized for locating the at least one of the first connector and the second connector. A smaller diameter inner member is often used as the inner member for size reduction of the stack unit. In this case, the general purpose connectors used as the first connector and the second connector can be located in the relatively large room in the second internal space without the need for reducing the sizes of the general purpose connectors correspondingly to the reduction in the diameter of the inner member.

According to still another embodiment of the present invention, the stack unit further includes a restriction portion (81) having a one-side engagement portion (36) provided in an end portion (11B) of the inner member on the one side and an other-side engagement portion (43) provided in an end portion (11C) of the inner member on the other side for restricting relative rotation of the inner members of the adjacent stack units of the signal indicator lamp about the rotation axis with the other-side engagement portion of one of the adjacent stack units in engagement with the one-side engagement portion of the other stack unit.

With this arrangement, when the adjacent stack units are connected together, the other-side engagement portion of the inner member of the one stack unit is engaged with the one-side engagement portion of the inner member of the other stack unit. Thus, these inner members can be positioned relative to each other with respect to a rotation direction about the rotation axis.

According to further another embodiment of the present invention, the one-side engagement portion includes a plurality of projections each extending in the stacking direction, and the other-side engagement portion includes a plurality of trenches each extending in the stacking direction for respectively receiving the projections of the one-side engagement portion of the other stack unit, the trenches having different trench widths (W).

With this arrangement, when the adjacent stack units are connected together, the projections of the one-side engagement portion of the other stack unit are respectively inserted and received in the trenches of the other-side engagement portion of the one stack unit in the stacking direction. At this time, the trenches of the other-side engagement portion can respectively receive the projections of the one-side engagement portion having sizes corresponding to the trench widths thereof. This makes it possible to accurately position the inner members of the adjacent stack units relative to each other with respect to the rotation direction about the rotation axis while preventing erroneous insertion of the projections of the one-side engagement portion in the trenches of the other-side engagement portion.

According to still another embodiment of the present invention, the opposite end portions of the inner member defined with respect to the stacking direction partly project outward of the first connector and the second connector in the stacking direction.

With this arrangement, the first connector and the second connector are located inward of the opposite ends of the inner member with respect to the stacking direction. Thus, these connectors are protected so as not to contact external matter when the stack unit is present alone. Further, when the adjacent stack units are to be connected together, the inner members of these stack units are first connected to each other, and then the second connector of the one stack unit is connected to the first connector of the other stack unit. This prevents these connectors from contacting the inner members to be thereby damaged.

According to further another embodiment of the present invention, the inner member has an inner projection (41) projecting from an outer surface (11E) thereof, and the support portion has an overhang portion (21) projecting into the first internal space from an inner surface (10A) of the outer member defining the first internal space and adapted to be engaged with the inner projection in the stacking direction.

With this arrangement, the overhang portion projecting into the first internal space from the inner surface of the outer member is engaged with the inner projection of the outer surface of the inner member in the stacking direction. Thus, the support portion having the overhang portion can support the inner member immovably relative to the outer member in the stacking direction.

According to still another embodiment of the present invention, the inner projection abuts against the overhang portion in the stacking direction, and is slidable with respect to the overhang portion during the relative rotation of the inner member.

With this arrangement, the inner member is immovable relative to the outer member in the stacking direction with the inner projection abutting against the overhang portion in the stacking direction. The inner member is slid with respect to the overhang portion to be thereby rotatable relative to the outer member about the rotation axis.

According to further another embodiment of the present invention, the inner projection includes a first inner projection (41A), and the outer member includes an outer projection (25) provided on the inner surface thereof and projecting into the first internal space. The inner member is rotatable relative to the outer member between a first position at which the first inner projection and the outer projection are engaged with each other and a second position at which the first inner projection and the outer projection are disengaged from each other, the second position being away from the first position in the rotation direction (Y) about the rotation axis.

With this arrangement, the first inner projection of the inner projection is engaged with the outer projection provided on the inner surface of the outer member with the inner member located at the first position when the stack unit is present alone. Thus, the inner member is temporarily locked for prevention of inadvertent rotation thereof. When the adjacent stack units are to be connected together, the second connector of the one stack unit and the first connector of the other stack unit can be thereby smoothly connected to each other in alignment with each other with respect to the rotation direction. With the inner member located at the second position, on the other hand, the first inner projection and the outer projection are disengaged from each other, whereby the relative rotation of the inner member is permitted so as not to prevent the rotation of the outer member.

According to still another embodiment of the present invention, the outer member has a first guide groove (26) extending through the overhang portion in the stacking direction and, with the inner member located at the second position, the first inner projection is aligned with the first guide groove.

With this arrangement, the first inner projection is aligned with the first guide groove of the outer member with the inner member located at the second position, whereby the inner projection does not abut against the overhang portion in the stacking direction. Thus, the inner member can be attached to or detached from the first internal space of the outer member by moving the first inner projection through the first guide groove in the stacking direction.

According to further another embodiment of the present invention, the inner projection includes a second inner projection (41B) different from the first inner projection, and the overhang portion includes a second guide groove (27) provided away from the first guide groove in the rotation direction and extending in the stacking direction for receiving and guiding the second inner projection when the inner member is inserted into the first internal space in the stacking direction, and a closure portion (28) which closes an end (27B) of the second guide groove on a downstream side (X2) defined with respect to an insertion direction in which the inner member is inserted into the first internal space, and is engaged with the second inner projection from the downstream side when the second inner projection reaches the end of the second guide groove and rides on the closure portion.

With this arrangement, when the inner member is inserted into the first internal space in the stacking direction, the second inner projection is received and guided in the second guide groove of the overhang portion. The second inner projection rides on the closure portion to be engaged with the closure portion from the downstream side defined with respect to the insertion direction when reaching the end of the second guide groove. Thus, the inner member is immovable relative to the outer member in the stacking direction.

According to still another embodiment of the present invention, there is provided a signal indicator lamp (1) including the stack unit (4) having the features described above.

With this arrangement, the production costs of the signal indicator lamp can be reduced, because the stack unit can be easily assembled at reduced costs.

According to further another embodiment of the present invention, there is provided a signal indicator lamp (1), which includes a first stack unit (4A), and a second stack unit (4B) stacked on the first stack unit in a stacking direction, the first and second stack units each being the stack unit (4) having the aforementioned features, wherein the first stack unit and the second stack unit are connected to each other via the connection portions thereof by relative rotation of the outer members of the first stack unit and the second stack unit about the rotation axes, and the second connector of the first stack unit and the first connector of the second stack unit are connected to each other.

With this arrangement, the production costs of the signal indicator lamp can be reduced, because the first stack unit and the second stack unit can be easily assembled at reduced costs.

DESCRIPTION OF EMBODIMENTS

Figure 1:
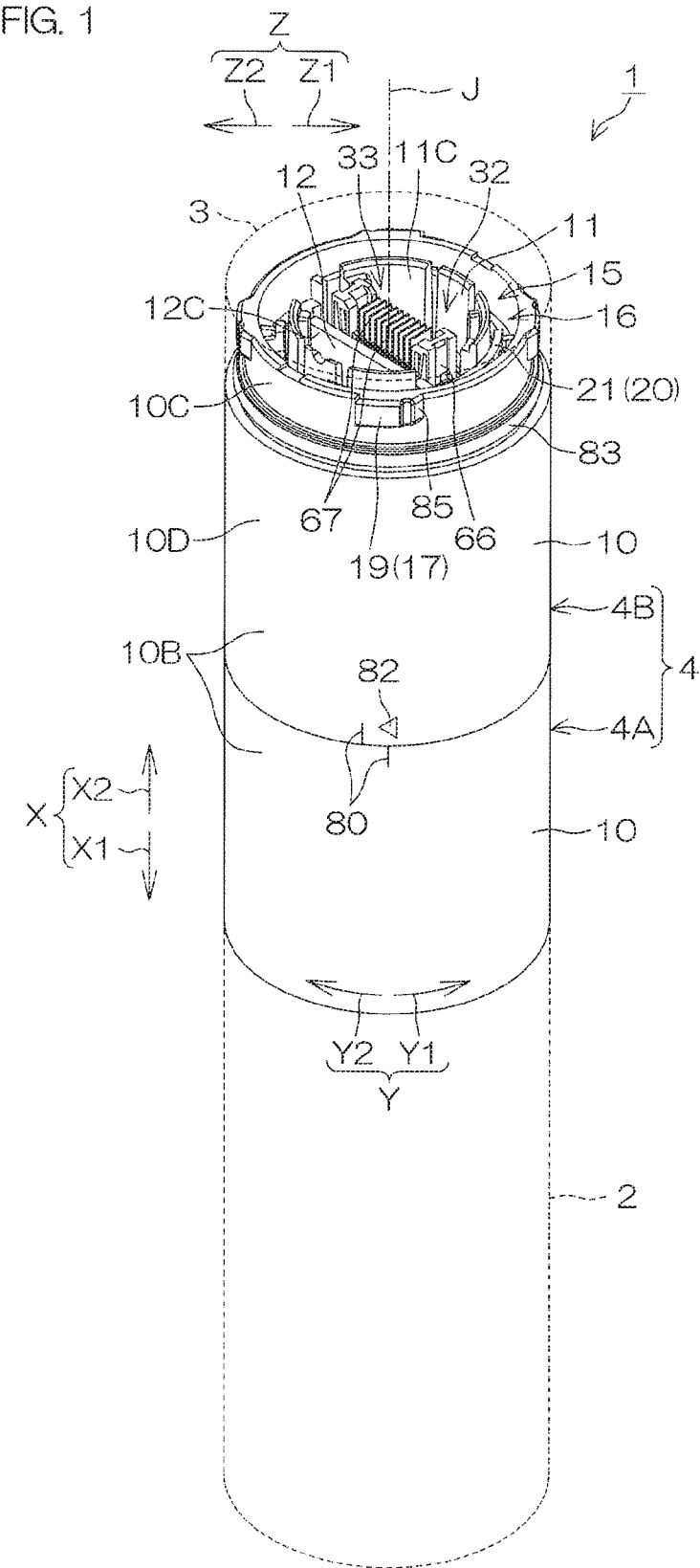
FIG. 1 is a perspective view of a signal indicator lamp according to one embodiment of the present invention.

With reference to the attached drawings, one embodiment of the present invention will hereinafter be described specifically. FIG. 1 is a perspective view of a signal indicator lamp 1 according to the embodiment of the present invention. The signal indicator lamp 1 is used at a production site in a plant or the like. The signal indicator lamp 1 has an elongated cylindrical shape. During use, the signal indicator lamp 1 may be set at any attitude depending on its use conditions. The signal indicator lamp 1 will hereinafter be described on the assumption that the signal indicator lamp 1 is disposed vertically upright with the vertical direction of the paper face of FIG. 1 corresponding to the longitudinal direction of the signal indicator lamp 1 for convenience. In FIG. 1, therefore, the upper side of the paper face is defined as the upper side of the signal indicator lamp 1, and the lower side of the paper face is defined as the lower side of the signal indicator lamp 1.

The signal indicator lamp 1 includes a base unit 2, a head cover 3, and a stack unit 4. The base unit 2 is attached to an attachment object such as equipment at the production site. The stack unit 4 and the head cover 3 are stacked in this order on the base unit 2 longitudinally of the signal indicator lamp 1. That is, the stack unit 4 and the head cover 3 are stacked in a predetermined stacking direction X extending longitudinally of the signal indicator lamp 1 to provide the signal indicator lamp 1. Defined with respect to the stacking direction X are one side X1 and the other side X2 opposite from the one side X1. In this embodiment, the one side X1 corresponds to the lower side in FIG. 1, and the other side X2 corresponds to the upper side in FIG. 1. An inverted arrangement is also possible, in which the one side X1 corresponds to the upper side in FIG. 1 and the other side X2 corresponds to the lower side in FIG. 1. In this embodiment, most parts of the signal indicator lamp 1 other than electrical components such as a board to be described later are made of a resin, but the material for the signal indicator lamp 1 is not limited to the resin.

The center axis of the cylindrical signal indicator lamp 1 is defined as a rotation axis J. The rotation axis J extends in the stacking direction X. A rotation direction Y is defined circumferentially about the rotation axis J, and includes a first rotation direction Y1 and a second rotation direction Y2 opposite from the first rotation direction Y1. The first rotation direction Y1 corresponds to a counterclockwise direction defined when the signal indicator lamp 1 is seen from the upper side in FIG. 1. The second rotation direction Y2 corresponds to a clockwise direction defined when the signal indicator lamp 1 is seen from the upper side in FIG. 1. A radial direction Z is defined about the rotation axis J, and includes a radially inward direction Z1 toward the rotation axis J, and a radially outward direction Z2 away from the rotation axis J. The components of the signal indicator lamp 1 will hereinafter be described with reference to these directions defined based on the rotation axis J.

The base unit 2 has a hollow cylindrical shape having a center axis defined by the rotation axis J. The base unit 2 incorporates a power supply board (not shown) for supplying electric power to the stack unit 4, and a control board (not shown) for controlling the operation of the stack unit 4. The head cover 3 is positioned at an upper end of the signal indicator lamp 1. The head cover 3 has a disk shape having a center axis defined by the rotation axis J.

The stack unit 4 may include a single stack unit 4 or a plurality of stack units 4 for the single signal indicator lamp 1. In this embodiment, two stack units 4 are arranged in adjacent relation in the stacking direction X between the base unit 2 and the head cover 3. One of the two stack units 4 positioned on the one side X1 is referred to as first stack unit 4A, and the other stack unit 4 positioned on the other side X2 is referred to as second stack unit 4B. The stack units 4 each have a cylindrical shape having a center axis defined by the rotation axis J.

Outer circumferential surfaces of the base unit 2, the head cover 3 and the stack units 4 in the stacked state are generally flush with each other to define an outer circumferential surface of the entire signal indicator lamp 1. Next, the stack units 4 will be described in detail. The stack units 4 each include an outer member 10 defining an outer shell thereof, and an inner member 11 and a board 12 which are disposed in the outer member 10.

Figure 2:
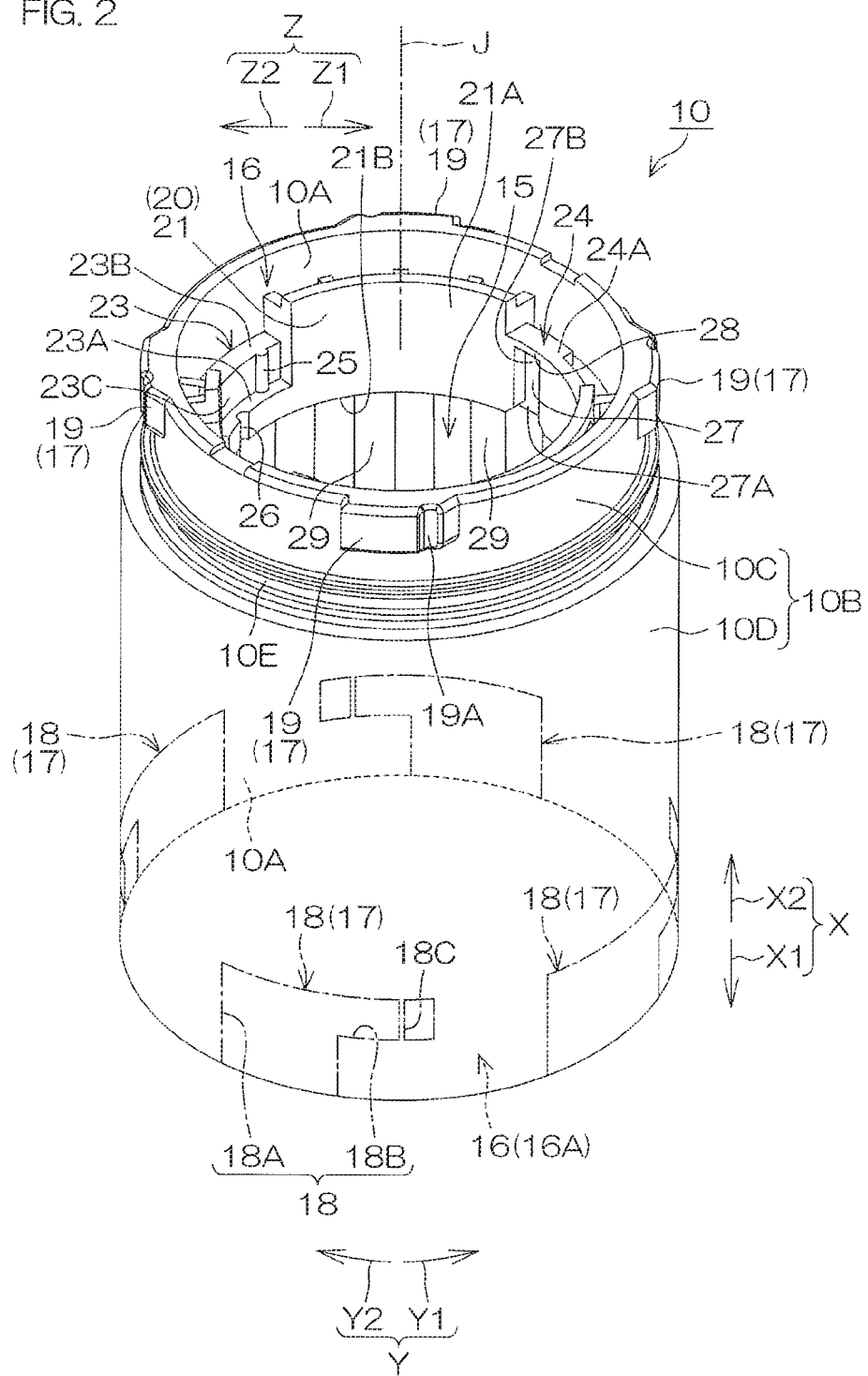
FIG. 2 is a perspective view of an outer member of a stack unit of the signal indicator lamp.

FIG. 2 is a perspective view of the outer member 10. The attitude of the outer member 10 in FIG. 2 corresponds to the attitude of the outer member 10 in FIG. 1. The outer member 10 has a hollow cylindrical shape having a center axis defined by the rotation axis J. The outer member 10 has a hollow portion defined as a first internal space 15, and a pair of first openings 16 respectively positioned at opposite ends thereof defined with respect to the stacking direction X. The first internal space 15 is a cylindrical space having a center axis defined by the rotation axis J, and defined by an inner surface 10A of the outer member 10. The pair of first openings 16 each have a round shape having a center axis defined by the rotation axis J, and the first internal space 15 is open to the opposite sides defined with respect to the stacking direction X via these first openings 16.

The outer member 10 has an outer circumferential surface 10B including a smaller diameter portion 10C located at an end thereof on the other side X2, and a greater diameter portion 10D located closer to the one side X1 than the smaller diameter portion 10C. The smaller diameter portion 10C has a smaller diameter than the greater diameter portion 10D. The smaller diameter portion 10C has a groove 10E provided adjacent a boundary between the smaller diameter portion 10C and the greater diameter portion 10D as extending in the rotation direction Y.

The outer member 10 has a connection portion 17. The connection portion 17 includes a first connection portion 18 and a second connection portion 19. The first connection portion 18 includes a plurality of first connection portions 18 (four first connection portions 18 in this embodiment) which are arranged in spaced relation in the rotation direction Y in an end portion of the inner surface 10A of the outer member 10 on the one side X1. The first connection portions 18 each include a first groove 18A provided in the inner surface 10A as linearly extending from a one-side (X1) edge toward the other side X2, and a second groove 18B linearly extending from an other-side (X2) end of the first groove 18A in the first rotation direction Y1. Therefore, the first connection portions 18 are grooves each of which has a generally L-shape as a whole, as seen in the radial direction Z. The first connection portions 18 each have a linear projection 18C provided in the second groove 18B at a position offset in the first rotation direction Y1. The linear projection 18C projects in the radially inward direction Z1, and extends across the second groove 18B in the stacking direction X.

The second connection portion 19 includes second connection portions 19 provided in the same number as the first connection portions 18. The second connection portions 19 are arranged in spaced relation in the rotation direction Y on an end portion of the smaller diameter portion 10C of the outer circumferential surface 10B of the outer member 10 on the other side X2. The second connection portions 19 are projections each projecting in the radially outward direction Z2 and extending in the rotation direction Y. The second connection portions 19 each have a notch 19A provided at a position offset in the first rotation direction Y1 in a radially outward (Z2) surface thereof as extending in the stacking direction X.

The outer member 10 has a support portion 20 provided in an end portion of the inner surface 10A thereof on the other side X2 as a part of the inner surface 10A thereof. The support portion 20 has an overhang portion 21 projecting into the first internal space 15 from the inner surface 10A.

The overhang portion 21 has a ring shape extending in the rotation direction Y about a center axis thereof defined by the rotation axis J. The overhang portion 21 may have a single first recess 23 and a single second recess 24, or a plurality of first recesses 23 and a plurality of second recesses 24. In this embodiment, two first recesses 23 and two second recesses 24 are provided, which are alternately arranged in the rotation direction Y. A distance between adjacent ones of the first recesses 23 and the second recesses 24 may be constant or not constant. The first recesses 23 and the second recesses 24 are each recessed from an other-side (X2) end face of the overhang portion 21 toward the one side X1, and exposed from an inner peripheral surface 21A of the overhang portion 21 in the radially inward direction Z1.

The first recesses 23 each have a bottom surface including a first bottom surface 23A located closer to the other side X2 than a one-side (X1) end face 21B of the overhang portion 21, and a second bottom surface 23B located closer to the other side X2 than the first bottom surface 23A. The first bottom surface 23A and the second bottom surface 23B are flat surfaces perpendicular to the rotation axis J and each extending in the rotation direction Y. A radially outward (Z2) edge of the first bottom surface 23A and a radially inward (Z1) edge of the second bottom surface 23B are located in the same position with respect to the radial direction Z. The support portion 20 has arcuate surfaces 23C each provided between the radially outward (Z2) edge of the first bottom surface 23A and the radially inward (Z1) edge of the second bottom surface 23B as extending in the rotation direction Y.

The arcuate surfaces 23C each integrally have an outer projection 25 provided at a position offset in the second rotation direction Y2 as projecting in the radially inward direction Z1 into the first internal space 15 and extending in the stacking direction X. The overhang portion 21 has first guide grooves 26 each provided in a portion of the inner peripheral surface 21A between the one-side (X1) end face 21B and the first bottom surface 23A as extending through the overhang portion 21 in the stacking direction X. The first guide grooves 26 are each offset from the outer projection 25 in the first rotation direction Y1, and exposed to both the end face 21B of the overhang portion 21 and the first bottom surface 23A.

The second recesses 24 each have a bottom surface 24A which is a flat surface perpendicular to the rotation axis J and extending in the rotation direction Y. The overhang portion 21 has second guide grooves 27 each provided in a portion of the inner peripheral surface 21A between the end face 21B and the bottom surface 24A as extending from the end face 21B to just short of the bottom surface 24A in the stacking direction X. With respect to the rotation direction Y, the second guide grooves 27 are each located at the same position as an end (downstream end) portion of the bottom surface 24A with respect to the first rotation direction Y1 away from the first guide grooves 26. One-side (X1) ends 27A of the second guide grooves 27 each have a width progressively increased toward the one side X1 as measured in the rotation direction Y, and are exposed to the end face 21B of the overhang portion 21. The overhang portion 21 has closure portions 28 each provided in a portion thereof between an other-side (X2) end 27B of the second guide groove 27 and the bottom surface 24A to close the end 27B from the other side X2.

On the inner surface 10A of the outer member 10, a plurality of lens portions 29 are arranged in the rotation direction Y in a region of the inner surface 10A between the overhang portion 21 and the first connection portions 18. The lens portions 29 are linear projections each having an arcuate sectional shape, projecting in the radially inward direction Z1 and extending in the stacking direction X.

Figure 3:
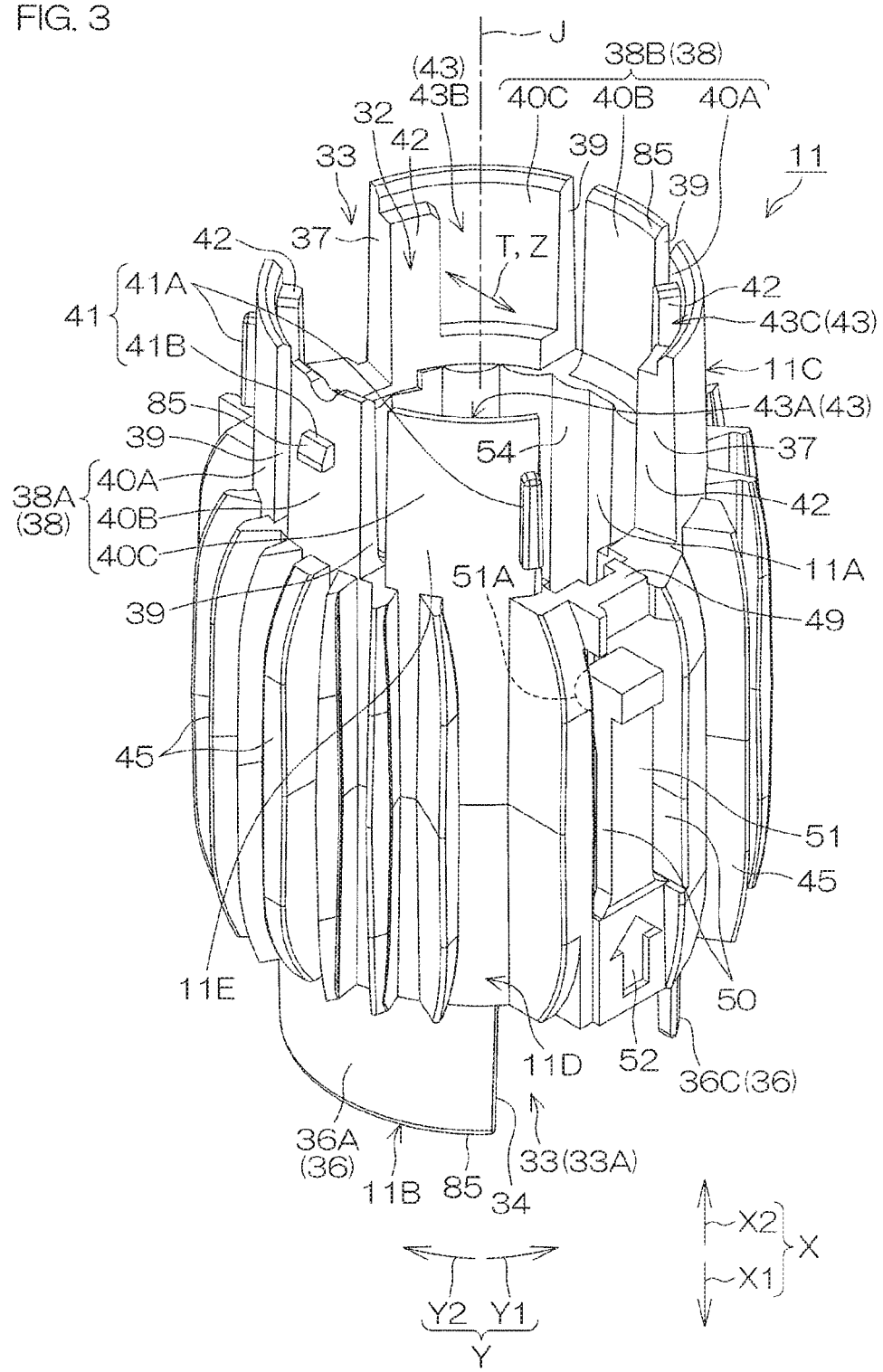
FIG. 3 is a perspective view of an inner member of the stack unit.
Figure 4:
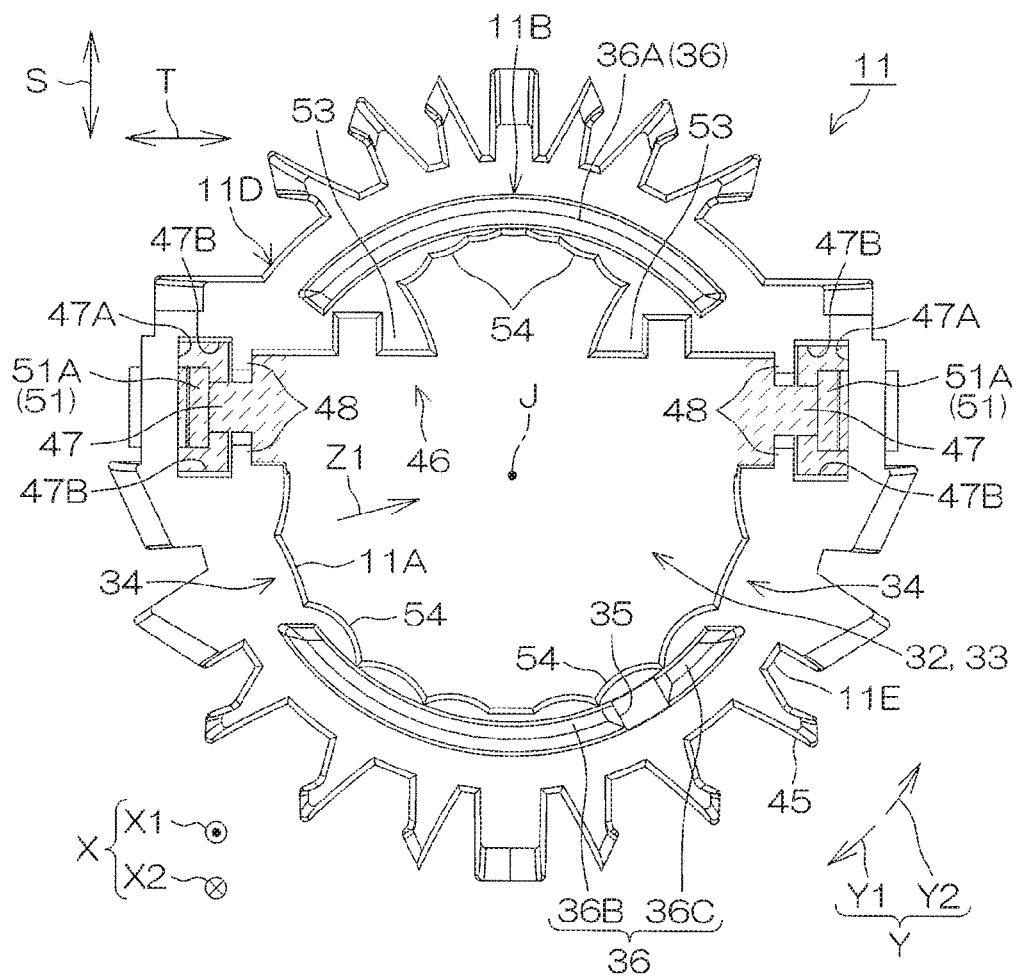
FIG. 4 is a bottom view of the inner member.
Figure 5:
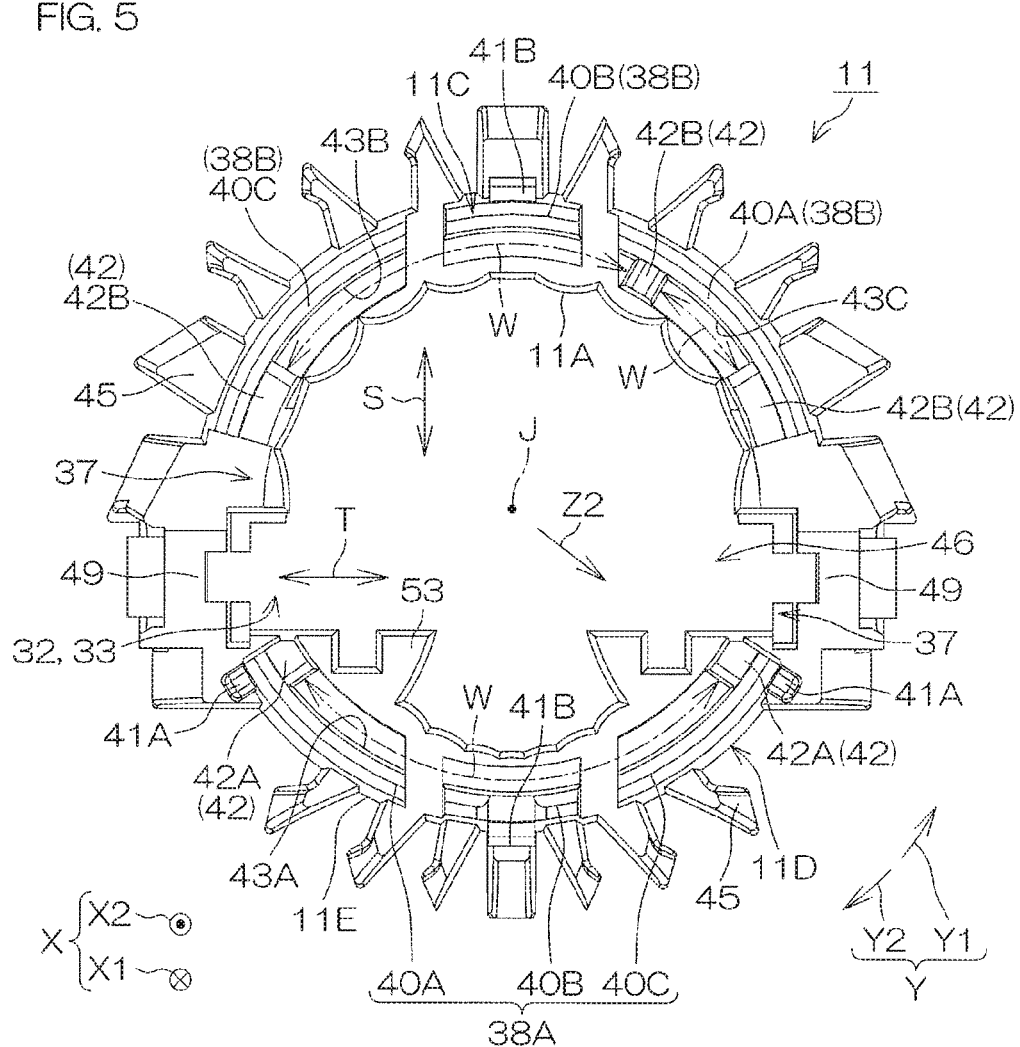
FIG. 5 is a plan view of the inner member.

FIG. 3 is a perspective view of the inner member 11. The attitude of the inner member 11 in FIG. 3 corresponds to the attitude of the inner member 11 in FIG. 1. FIG. 4 is a bottom view of the inner member 11 assuming the attitude shown in FIG. 3. FIG. 5 is a plan view of the inner member 11 assuming the attitude shown in FIG. 3. Referring to FIG. 3, the inner member 11 is a hollow cylindrical member having a center axis defined by the rotation axis J. The inner member 11 has a hollow portion defined as a second internal space 32, and a pair of second openings 33 respectively positioned at opposite ends thereof defined with respect to the stacking direction X. The second internal space 32 is a cylindrical space having a center axis defined by the rotation axis J, and is defined by an inner surface 11A of the inner member 11. The pair of second openings 33 each have a round shape having a center axis defined by the rotation axis J, and the second internal space 32 is open to the opposite sides in the stacking direction X via the second openings 33. The inner member 11 integrally includes a one-side end portion 11B located on the one side X1, an other-side end portion 11C located on the other side X2, and a middle portion 11D provided between the one-side end portion 11B and the other-side end portion 11C.

The one-side end portion 11B has a first cutaway portion 34 and a second cutaway portion 35 each extending from the one side X1 in the stacking direction X. As shown in FIG. 4, the first cutaway portion 34 includes a plurality of first cutaway portions 34 (two first cutaway portions 34 in this embodiment) spaced from each other in the rotation direction Y, and the second cutaway portion 35 includes a single second cutaway portion 35 or a plurality of second cutaway portions 35 (one second cutaway portion 35 in this embodiment) disposed between the two first cutaway portions 34. The second cutaway portion 35 has a smaller width than the first cutaway portions 34 as measured in the rotation direction Y. The one-side end portion 11B is divided into a plurality of one-side engagement portions 36 (three one-side engagement portions 36 in this embodiment) with respect to the rotation direction Y by the first cutaway portion 34 and the second cutaway portion 35. These one-side engagement portions 36 are projections each having an arcuate sectional shape and extending from the middle portion 11D to the one side X1 in the stacking direction X.

The three one-side engagement portions 36 include a first one-side engagement portion 36A having the greatest dimension as measured in the rotation direction Y, a second one-side engagement portion 36B having the second greatest dimension as measured in the rotation direction Y, and a third one-side engagement portion 36C having the smallest dimension as measured in the rotation direction Y. The first one-side engagement portion 36A, the third one-side engagement portion 36C and the second one-side engagement portion 36B are arranged in this order in the first rotation direction Y1. The third one-side engagement portion 36C is disposed adjacent the second one-side engagement portion 36B. The first one-side engagement portion 36A is opposed to the second one-side engagement portion 36B and the third one-side engagement portion 36C about the rotation axis J.

Referring to FIG. 3, the other-side end portion 11C has a first cutaway portion 37 extending from the other side X2 in the stacking direction X. The first cutaway portion 37 includes a plurality of first cutaway portions 37 (two first cutaway portions 37 in this embodiment) spaced from each other in the rotation direction Y. The two first cutaway portions 37 are respectively located in the same positions as the two first cutaway portions 34 of the one-side end portion 11B with respect to the rotation direction Y. The other-side end portion 11C is divided into a plurality of split portions 38 (two split portions 38 in this embodiment) with respect to the rotation direction Y by these first cutaway portions 37. These split portions 38 are projections each having an arcuate sectional shape and extending from the middle portion 11D to the other side X2 in the stacking direction X. One of the two split portions 38 is sometimes referred to as a first split portion 38A, and the other split portion 38 is sometimes referred to as a second split portion 38B. The first split portion 38A and the second split portion 38B are opposed to each other about the rotation axis J. The first split portion 38A is located in the same position as the first one-side engagement portion 36A with respect to the rotation direction Y, and the second split portion 38B is located in the same position as the second one-side engagement portions 36B, 36C with respect to the rotation direction Y.

The split portions 38 each have a second cutaway portion 39 extending from the other side X2 in the stacking direction X. The second cutaway portion 39 has a smaller width than the first cutaway portion 37 as measured in the rotation direction Y. The second cutaway portion 39 includes a plurality of second cutaway portions 39 (two second cutaway portions 39 in this embodiment) spaced from each other in the rotation direction Y. The split portions 38 are each further divided into a plurality of smaller split portions (three smaller split portions 40A, 40B, 40C in this embodiment) with respect to the rotation direction Y by these second cutaway portions 39. The smaller split portions 40A, 40B, 40C are arranged in this order in the first rotation direction Y1. The smaller split portions 40A, 40C have substantially the same dimension, and the smaller split portion 40B has the smallest dimension as measured in the rotation direction Y.

The split portions 38 each have an inner projection 41 provided on an outer surface 11E of the inner member 11 as projecting from the outer surface 11E in the radially outward direction Z2. The inner projection 41 includes first inner projections 41A respectively provided on the smaller split portions 40A, 40C of the first split portion 38A, and second inner projections 41B respectively provided on the smaller split portions 40B of the first split portion 38A and the second split portion 38B separately from the first inner projections 41A. The first inner projections 41A are linear projections each elongated in the stacking direction X. The first inner projection 41A of the first smaller split portion 40A is located at a downstream end portion of the first smaller split portion 40A with respect to the second rotation direction Y2, and the first inner projection 41A of the smaller split portion 40C is located at a downstream end portion of the smaller split portion 40C with respect to the first rotation direction Y1. The second inner projections 41B are small pieces each having a generally cuboidal shape.

The inner member 11 has a plurality of ribs 42 (five ribs 42 in this embodiment) provided on the split portions 38 in spaced relation in the rotation direction Y as projecting from the inner surface 11A thereof in the radially inward direction Z1 and extending in the stacking direction X. Referring to FIG. 5, these ribs 42 include first ribs 42A respectively provided on the smaller split portions 40A, 40C of the first split portion 38A, two second ribs 42B provided on the smaller split portion 40A of the second split portion 38B, and one second rib 42B provided on the smaller split portion 40C of the second split portion 38B. The first ribs 42A are respectively located at a downstream end portion of the smaller split portion 40A with respect to the second rotation direction Y2 and at a downstream end portion of the smaller split portion 40C with respect to the first rotation direction Y1. The second ribs 42B are respectively located at opposite end portions of the smaller split portion 40A with respect to the rotation direction Y and at a downstream end portion of the smaller split portion 40C with respect to the first rotation direction Y1.

Other-side engagement portions 43 are defined by these ribs 42 on the inner surface 11A in the other-side end portion 11C (see FIG. 3). The other-side engagement portions 43 are trenches respectively defined between the adjacent first ribs 42A and between the adjacent second ribs 42B. These other-side engagement portions 43 are each recessed from an other-side (X2) end face of the other-side end portion 11C toward the one side X1, and exposed from the inner surface 11A of the other-side end portion 11C in the radially inward direction Z1.

The other-side engagement portion 43 defined between the adjacent first ribs 42A on the first split portion 38A is referred to as first other-side engagement portion 43A. The first other-side engagement portion 43A spans over the smaller split portions 40A, 40B, 40C of the first split portion 38A. The other-side engagement portion 43 defined between the second rib 42B on the smaller split portion 40C of the second split portion 38B and the second rib 42B located at the downstream side of the smaller split portion 40A of the second split portion 38B with respect to the first rotation direction Y1 is referred to as second other-side engagement portion 43B. The second other-side engagement portion 43B spans over the smaller split portions 40A, 40B, 40C of the second split portion 38B. The other-side engagement portion 43 defined between the two second ribs 42B on the smaller split portion 40A is referred to as third other-side engagement portion 43C. The other-side engagement portions 43 have different trench widths W, i.e., different dimensions as measured in the rotation direction Y. More specifically, the width W decreases in the order of the first other-side engagement portion 43A, the second other-side engagement portion 43B and the third other-side engagement portion 43C.

A plurality of light guide members 45 are provided on the middle portion 11D as projecting from the outer surface 11E in the radially outward direction Z2 and extending in the stacking direction X. The light guide members 45 are disposed generally radially about the rotation axis J. The light guide members 45 may have different sectional shapes perpendicular to the rotation axis J. The first split portion 38A and the second split portion 38B are opposed to each other in an opposition direction S about the rotation axis J. The opposition direction S is perpendicular to the rotation axis J.

Referring to FIG. 4, a location space 46 is provided as a part of the second internal space 32 in a position offset from the rotation axis J toward the first one-side engagement portion 36A in the opposition direction S. The location space 46 extends in a direction T perpendicular to both the rotation axis J and the opposition direction S. The middle portion 11D has a pair of grooves 47 (hatched with broken lines in FIG. 4) provided in the inner surface 11A at opposite ends of the location space 46 defined with respect to the perpendicular direction T as extending in the stacking direction X.

One of the pair of grooves 47 is present in the same position as one of the two first cutaway portions 34 with respect to the rotation direction Y, and the other groove 47 is present in the same position as the other first cutaway portion 34 with respect to the rotation direction Y. In the inner surface 11A, the grooves 47 each have a groove bottom 47A and a pair of side surfaces 47B extending upright from opposite edges of the groove bottom 47A defined with respect to the opposition direction S. The pair of side surfaces 47B respectively have positioning ribs 48 which project toward each other and extend in the stacking direction X. The grooves 47 are exposed from a one-side (X1) end face of the middle portion 11D. The middle portion 11D has closure portions 49 which respectively close otherside (X2) ends of the grooves 47 from the other side X2 (see FIGS. 3 and 5).

The groove bottoms 47A of the grooves 47 each have a through-hole 50 as shown in FIG. 3. The through-hole 50 has a generally U-shape as seen in the radial direction Z, and extends through the middle portion 11D in the radial direction Z. Portions of the middle portion 11D each surrounded by the generally U-shaped through-hole 50 serve as engagement portions 51 each elongated in the stacking direction X. The two engagement portions 51 respectively face to the grooves 47. One-side (X1) end portions of the engagement portions 51 are connected to the middle portion 11D. Thus, the engagement portions 51 are each entirely supported at one end thereof by the middle portion 11D. Distal end portions 51A of the engagement portions 51 on the other side X2 respectively project into the grooves 47, and each have a hook shape. The engagement portions 51 are resiliently deformable so that the distal end portions 51A are movable in the perpendicular direction T. The middle portion 11D has a mark 52 provided on the outer surface 11E for indicating an insertion direction in which the board 12 is inserted into the inner member 11 (toward the other side X2 in this embodiment).

Referring to FIG. 4, the middle portion 11D has a plurality of projections 53 (two projections 53 in this embodiment) arranged in the rotation direction Y on the inner surface 11A in the same position as the first one-side engagement portion 36A with respect to the rotation direction Y as each projecting into the location space 46 and extending in the stacking direction X. On the inner surface 11A of the middle portion 11D, a plurality of lens portions 54 are arranged in the rotation direction Y in a region of the inner surface 11A excluding the grooves 47 and the projections 53. The lens portions 54 are linear projections each having an arcuate sectional shape projecting in the radially inward direction Z1 and extending in the stacking direction X.

Figure 6:
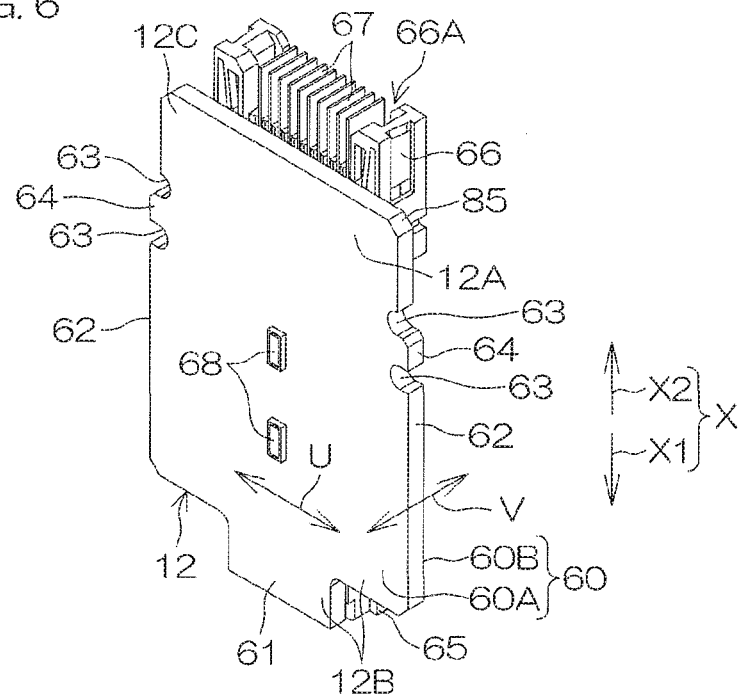
FIG. 6 is a perspective view of a board of the stack unit.

FIG. 6 is a perspective view of the board 12. The attitude of the board 12 in FIG. 6 corresponds to the attitude of the board 12 in FIG. 1. The board 12 has a pair of parallel major surfaces 60. The major surfaces 60 each have a generally rectangular shape elongated in the stacking direction X. More strictly, the major surfaces 60 each have a projection 61 projecting from a generally middle portion of a one-side (X1) edge thereof toward the one side X1. One of the pair of major surfaces 60 which is mainly seen in FIG. 6 is referred to as a first major surface 60A, and the other major surface 60 is referred to as a second major surface 60B. The board 12 has a pair of end faces 62 which connect opposite edges of the major surfaces 60 defined with respect to a transverse direction U. The end faces 62 each have two recesses 63 arranged in the stacking direction X in same positions closer to the other side X2 and recessed inward of the board 12 in the transverse direction U. The recesses 63 each extend through the board 12 in a board thicknesswise direction V. Projections 64 projecting outward in the transverse direction U are each defined between the two recesses 63 on each of the opposite end portions of the board 12 defined with respect to the transverse direction U.

Figure 7:
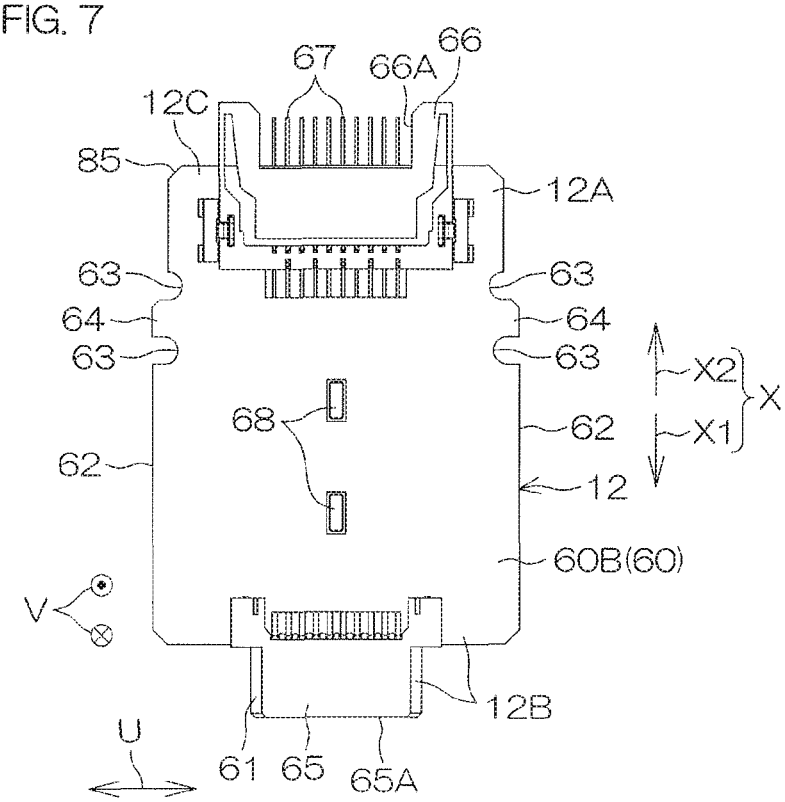
FIG. 7 is a side view of the board.

Referring to FIG. 7, which is a side view of the board 12 as seen in the board thicknesswise direction V, a portion 12A of the board 12 located closer to the other side X2 than the recesses 63 and the projections 64 has a smaller width as measured in the transverse direction U. Therefore, the projections 64 project outward from the end faces 62 in the transverse direction U to a greater extent than the portion 12A. A first connector 65 and a second connector 66 for external electrical connection are provided on the second major surface 60B of the board 12.

The first connector 65 is provided on an end portion 12B of the board 12 on the one side X1, and the second connector 66 is provided on an end portion 12C of the board 12 on the other side X2. In the end portion 12B, the major surface 60 includes a projection 61 projecting to the one side X1, and the first connector 65 overlaps with the projection 61 in the board thicknesswise direction V. The first connector 65 has a plurality of insertion holes 65B (see FIG. 11 to be described later) provided in an end face 65A thereof on the one side X1 and arranged in the transverse direction U. The second connector 66 partly projects from the board 12 to the other side X2. The second connector 66 has a recess 66A provided in an end face thereof on the other side X2 as recessed toward the one side X1 and extending therethrough in the board thicknesswise direction V. The second connector 66 includes a plurality of pins 67 arranged in the transverse direction U in the recess 66A.

General purpose connectors can be used as the first connector 65 and the second connector 66 for connection at the end portions of the board 12 in the stacking direction X along the major surfaces 60 of the board 12. This reduces the costs of the stack unit 4. The first connector 65 and the second connector 66 may be preliminarily attached to the board 12. That is, the board 12, the first connector 65 and the second connector 66 can be handled as a unitary member in assembling the stack unit 4. This simplifies the construction of the stack unit 4, and facilitates the assembling of the stack unit 4 with a reduced assembling time. The production costs of the overall signal indicator lamp 1 can be reduced by the facilitation of the assembling of the stack unit 4 and the cost reduction of the stack unit 4.

Figure 8:
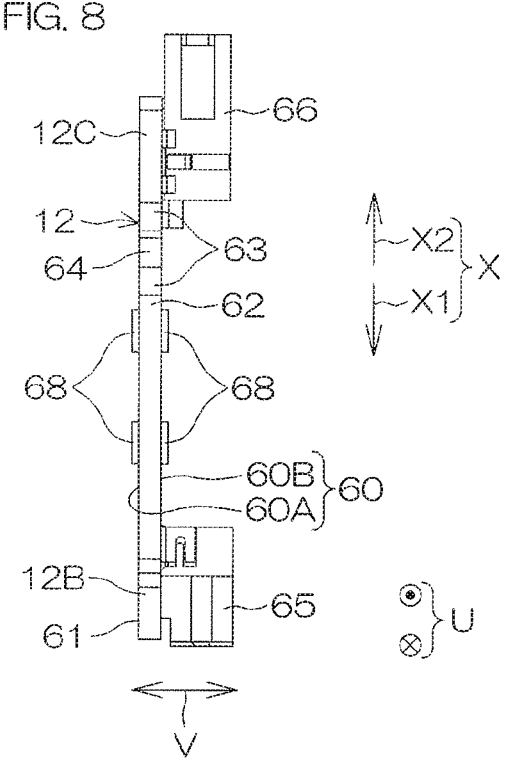
FIG. 8 is a side view of the board as seen in a different direction from that in FIG. 7.

Referring to FIG. 8, which is a side view of the board 12 as seen in the transverse direction U, light sources 68 are respectively provided on the major surfaces 60 of the board 12 in a region defined between the first connector 65 and the second connector 66 with respect to the stacking direction X. Usable examples of the light sources 68 include LEDs. The light sources 68 on the respective major surfaces 60 may each include a single light source 68 or a plurality of light sources 68. In this embodiment, two light sources 68 are arranged in the stacking direction X. In the board 12, the light sources 68 are each electrically connected to the first connector 65 and the second connector 66.

The assembling of the stack unit 4 will hereinafter be described. First, how to mount the board 12 in the inner member 11 will be described. The board 12 is first inserted into the location space 46 of the second internal space 32 toward the other side X2 through the second opening 33A of the inner member 11 on the one side X1 with the other-side (X2) end portion 12C thereof ahead (see FIGS. 3 and 4). At this time, the insertion direction of the board 12 can be confirmed by the mark 52 provided on the inner member 11 (see FIG. 3).

Figure 9:
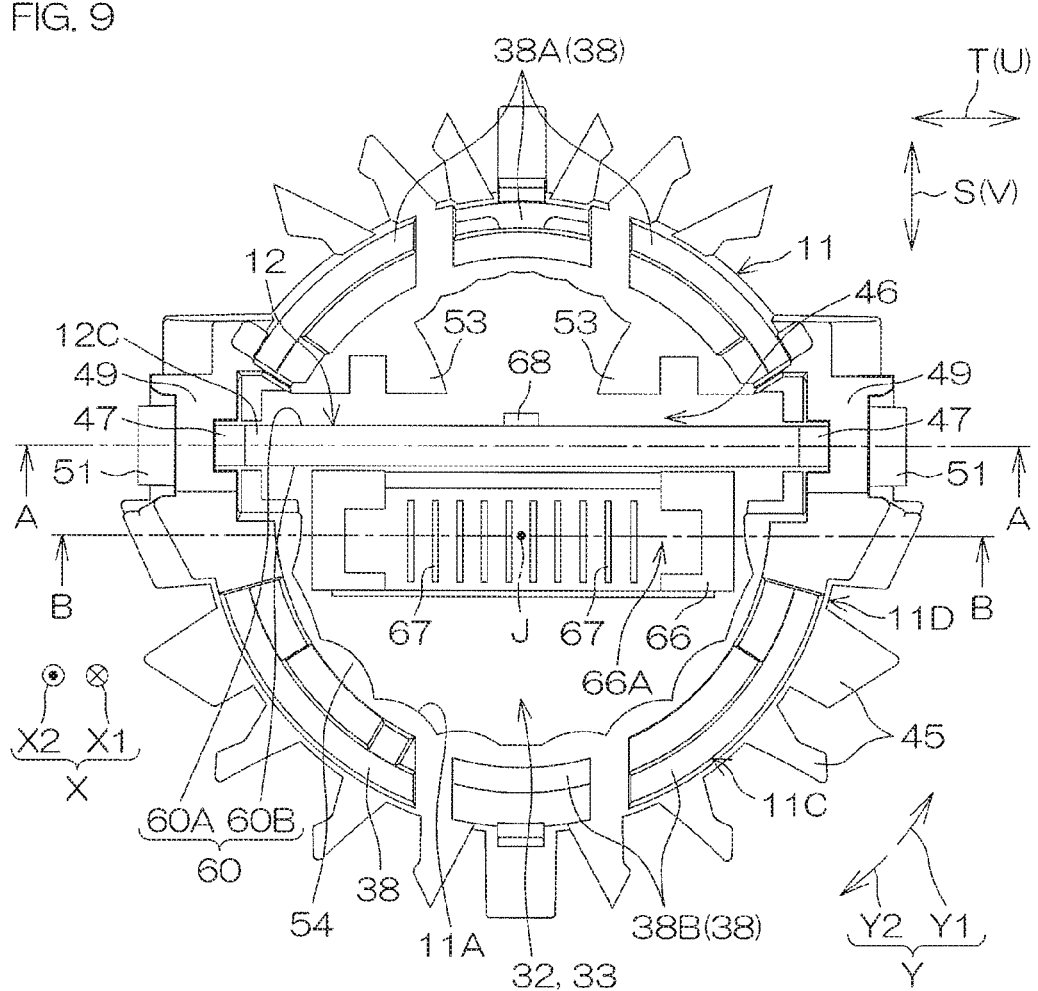
FIG. 9 is a plan view of the inner member with the board held therein.

Referring to FIG. 9, the transverse direction U and the board thicknesswise direction V of the board 12 inserted in the location space 46 respectively coincide with the perpendicular direction T and the opposition direction S. The opposite end portions of the board 12 defined with respect to the transverse direction U are respectively received in the grooves 47 of the inner member 11 and held between the pairs of positioning ribs 48 (see FIG. 4) and, in this state, the board 12 is advanced to the other side X2 in the location space 46. When the pair of projections 64 of the board 12 reach the distal end portions 51A of the engagement portions 51 of the inner member 11, the engagement portions 51 are resiliently deformed so that the distal end portions 51A is away from the projections 64. Thus, the projections 64 ride over the distal end portions 51A toward the other side X2.

Figure 10:
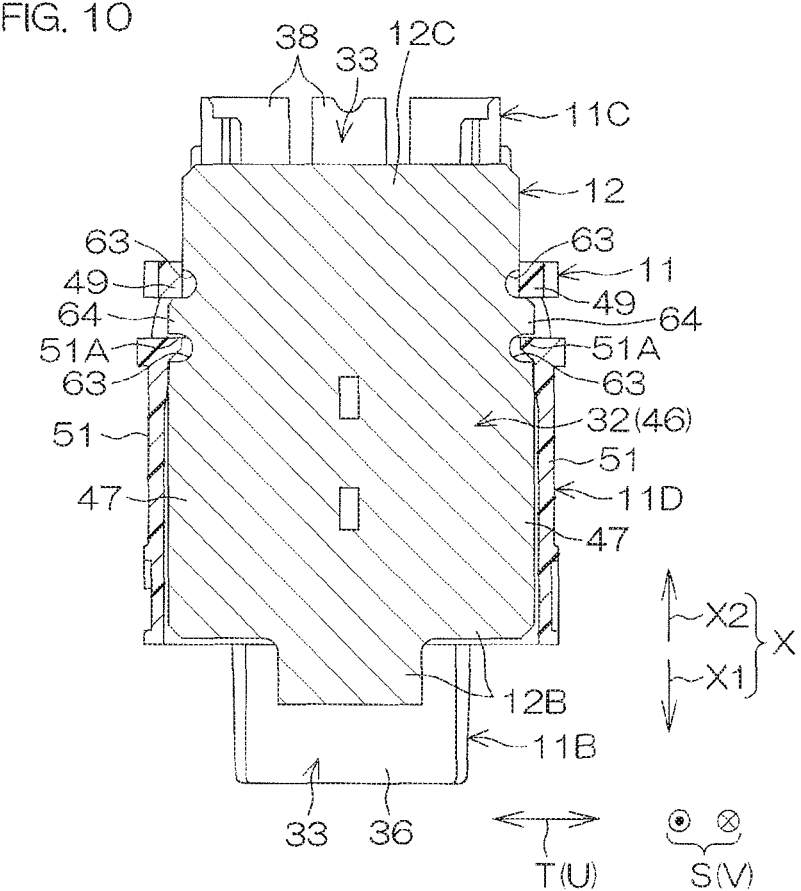
FIG. 10 is a sectional view taken along a line A-A in FIG. 9.

Then, as shown in FIG. 10, which is a sectional view taken along a line A-A in FIG. 9, the projections 64 are brought into contact with the closure portions 49 of the inner member 11 respectively closing the other-side (X2) end portions of the grooves 47 from the one side X1. Further, the engagement portions 51 previously resiliently deformed are restored to their original state, so that the distal end portions 51A are respectively fitted in the recesses 63 of the board 12 located closer to the one side X1 than the projections 64 from the outside in the perpendicular direction T. Thus, the board 12 is held by the inner member 11 to be thereby completely mounted in the inner member 11. In this state, the pair of engagement portions 51 hold the board 12 between the distal end portions 51A thereof from the outside in the perpendicular direction T. Thus, the board 12 is positioned with respect to the stacking direction X as well as the perpendicular direction T.

Referring to FIG. 9, the board 12 mounted in the inner member 11 is held in the second internal space 32 with the pair of major surfaces 60 thereof extending in the stacking direction X, and exposed to the outside in the stacking direction X through the pair of second openings 33. In this state, the opposite end portions of the board 12 defined with respect to the transverse direction U are respectively continuously received in the grooves 47, and held between the pair of positioning ribs 48 (see FIG. 4) in the grooves 47. Thus, the board 12 is positioned with respect to the opposition direction S as well as the rotation direction Y by the positioning ribs 48.

The board 12 is offset from the rotation axis J toward the first split portion 38A in the opposition direction S. With this arrangement, a room can be provided in a position overlapping with the rotation axis J in the second internal space 32 of the inner member 11. On the other hand, the first connector 65 and the second connector 66 are located in the room provided in the position overlapping with the rotation axis J in the second internal space 32. That is, the room can be effectively utilized for locating the first connector 65 and the second connector 66. Further, the inner member 11 may have a reduced diameter for size reduction of the stack unit 4. Even in this case, the general purpose connectors used as the first connector 65 and the second connector 66 can be located in the relatively large room in the second internal space 32 without the need for reducing the sizes of the general purpose connectors correspondingly to the reduction in the diameter of the inner member 11. Since the lens portions 54 and the like facing to the room can be freely incorporated in the room in the inner member 11, the design flexibility is improved. It is noted that only one of the first connector 65 and the second connector 66 may be disposed in the position overlapping with the rotation axis J.

Figure 11:
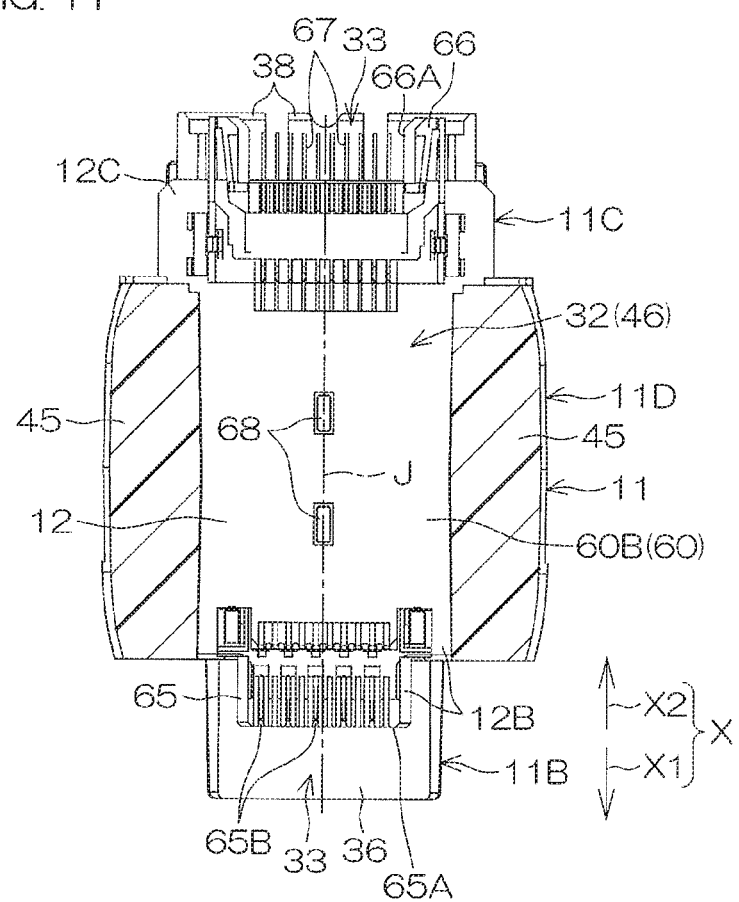
FIG. 11 is a sectional view taken along a line B-B in FIG. 9.

As shown in FIG. 11, which is a sectional view taken along a line B-B in FIG. 9, the one-side end portion 11B of the inner member 11 mounted with the board 12 partly projects from the first connector 65 toward the one side X1, and the other-side end portion 11C of the inner member 11 partly projects from the second connector 66 toward the other side X2. That is, the opposite end portions of the inner member 11 defined with respect to the stacking direction X partly project outward of the first connector 65 and the second connector 66 in the stacking direction X. Thus, these connectors are protected so as not to contact external matter when the stack unit 4 is present alone.

For the mounting of the board 12 in the inner member 11, a snap structure is used which includes the resiliently deformable engagement portions 51, and the recesses 63 and the projections 64 of the board 12. Therefore, the mounting of the board 12 in the inner member 11 is achieved with improved working efficiency in reduced time, and ensures easy recovery even if erroneous mounting occurs. If the board 12 is inserted into the second internal space 32 of the inner member 11 with the first and second major surfaces 60A, 60B reversed from each other, the projections 53 (see FIG. 9) projecting in the second internal space 32 of the inner member 11 are brought into contact with the second connector 66. This prevents the erroneous mounting with the first and second major surfaces 60A, 60B reversed from each other.

Next, how to combine the inner member 11 incorporating the board 12 with the outer member 10 will be described. First, the inner member 11 is inserted into the first internal space 15 of the outer member 10 in the stacking direction X toward the other side X2 through the first opening 16 provided on the one side X1 with the other-side end portion 11C ahead (see FIG. 2). That is, a downstream side with respect to an insertion direction in which the inner member 11 is inserted into the first internal space 15 corresponds to the other side X2. When the inner member 11 is to be inserted into the first internal space 15, the inner member 11 is positioned relative to the outer member 10 with respect to the rotation direction Y so that the first inner projections 41A thereof are respectively aligned with the first guide grooves 26 of the outer member 10 and the second inner projections 41B thereof are respectively aligned with the second guide grooves 27 of the outer member 10 (see FIGS. 2 and 3). Therefore, the first guide grooves 26 receive and guide the first inner projections 41A, and the second guide grooves 27 receive and guide the second inner projections 41B during the insertion of the inner member 11 into the first internal space 15.

As the inner member 11 is continuously inserted toward the other side X2, the first inner projections 41A respectively advance toward the other side X2 in the first guide grooves 26. Immediately before the first inner projections 41A pass through the first guide grooves 26, the second inner projections 41B reach the other-side (X2) end portions 27B of the second guide grooves 27 to contact the closure portions 28 (see FIG. 2). Then, the smaller split portions 40B (see FIG. 3) of the inner member 11 respectively provided with the second inner projections 41B are resiliently deformed in the radially inward direction Z1. Thus, the second inner projections 41B respectively ride over the closure portions 28 while moving in the radially inward direction Z1. The passage of the first inner projections 41A through the first guide grooves 26 and the riding of the second inner projections 41B over the closure portions 28 occur at substantially the same time.

After the second inner projections 41B respectively ride over the closure portions 28, the smaller split portions 40B previously resiliently deformed are restored to their original state. Thus, the second inner projections 41B are respectively engaged with the closure portions 28, i.e., the bottom surfaces 24A of the second recesses 24 of the overhang portion 21, from the other side X2. In this state, the first inner projections 41A are respectively received in the first recesses 23 of the overhang portion 21 of the support portion 20 of the outer member 10, and the second inner projections 41B are respectively received in the second recesses 24 of the overhang portion 21 (see FIG. 2). The first inner projections 41A are respectively positioned at the ends (downstream ends) of the first recesses 23 with respect to the first rotation direction Y1, and the second inner projections 41B are respectively positioned at the ends (downstream ends) of the second recesses 24 with respect to the first rotation direction Y1. In this state, the stack unit 4 is completed with the inner member 11 completely combined with the outer member 10, wherein the inner member 11 is disposed in the first internal space 15 of the outer member 10 (see FIG. 1).

With the stack unit 4 thus completed, the first opening 16 of the outer member 10 present on the one side X1 is located in substantially the same position as the second opening 33 of the inner member 11 present on the one side X1 with respect to the stacking direction X. Further, the first opening 16 of the outer member 10 present on the other side X2 is located in substantially the same position as the second opening 33 of the inner member 11 present on the other side X2 with respect to the stacking direction X. The board 12 mounted in the inner member 11 is exposed to the outside in the stacking direction X through the pair of first openings 16 and the pair of second openings 33.

Figure 12:
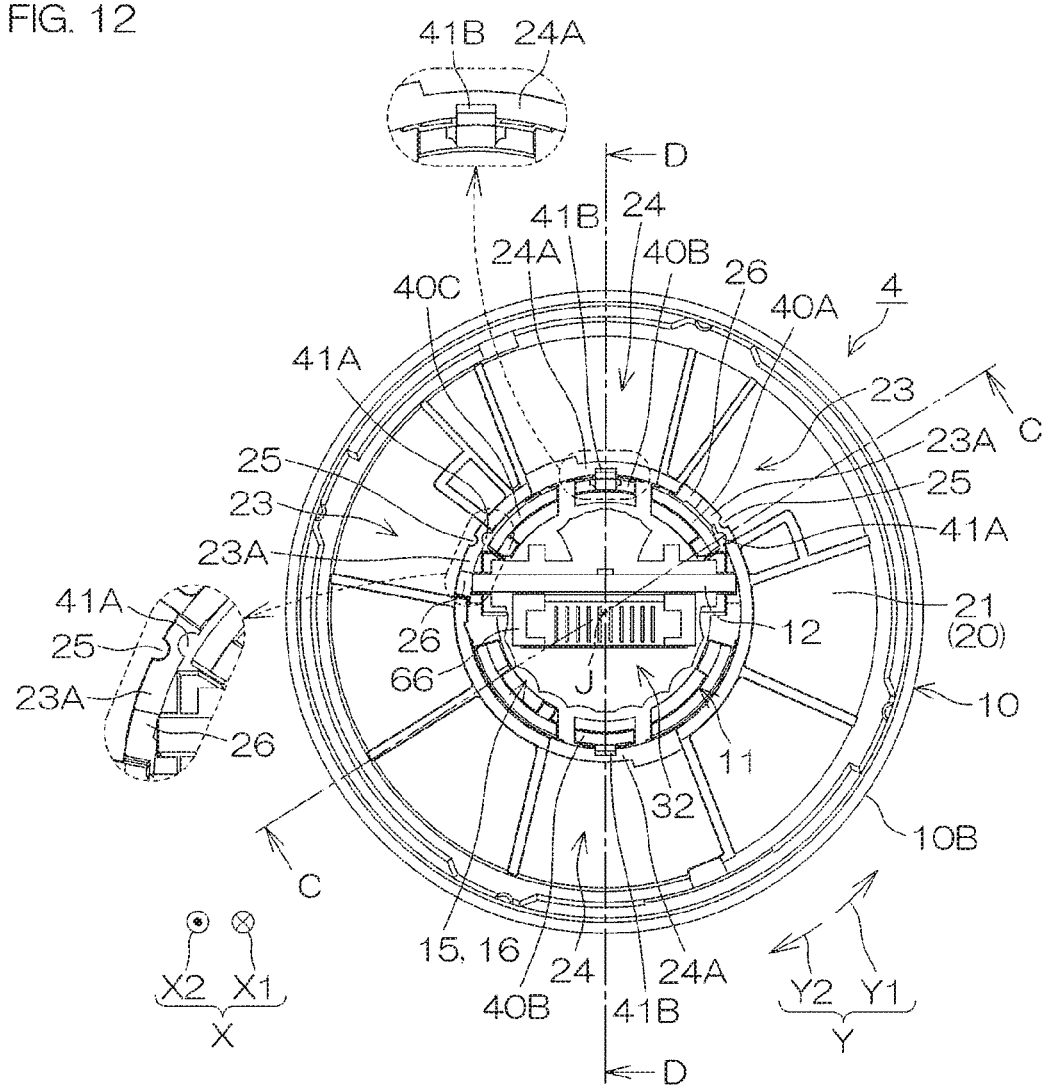
FIG. 12 is a schematic plan view of the stack unit with the inner member located at a first position.

In the completed stack unit 4, when the inner member 11 is fully rotated relative to the outer member 10 about the rotation axis J in the second rotation direction Y2, the inner member 11 is located at a first position shown in FIG. 12. In FIG. 12, the overhang portion 21 is illustrated as having a size greater than its actual size as measured in the radial direction Z, whereby the inner projections 41 and their peripheral portions are spaced from the outer circumferential surface of the outer member 10 in the radially inward direction Z1 for easy viewing (this also applies to FIGS. 13 to 17 to be described later). During the relative rotation of the inner member 11 to the first position, the first inner projections 41A are slid on the first bottom surfaces 23A of the first recesses 23 in abutment against the first bottom surfaces from the other side X2. During the relative rotation of the inner member 11 to the first position, the second inner projections 41B are slid on the bottom surfaces 24A of the second recesses 24 in abutment against the bottom surfaces 24A from the other side X2.

With the inner member 11 located at the first position, the first inner projections 41A are respectively located at the ends (downstream ends) of the first recesses 23 with respect to the second rotation direction Y2 after riding over the outer projections 25, and are respectively engaged with the outer projections 25 in the second rotation direction Y2. Even if the first inner projections 41A are respectively located away from the outer projections 25 in the second rotation direction Y2 as shown in FIG. 12, the first inner projections 41A are respectively kept in engagement with the outer projections 25 in the second rotation direction Y2. The second inner projections 41B may be respectively located at the ends (downstream ends) of the second recesses 24 or at middle portions of the second recesses 24 with respect to the second rotation direction Y2.

Figure 13:
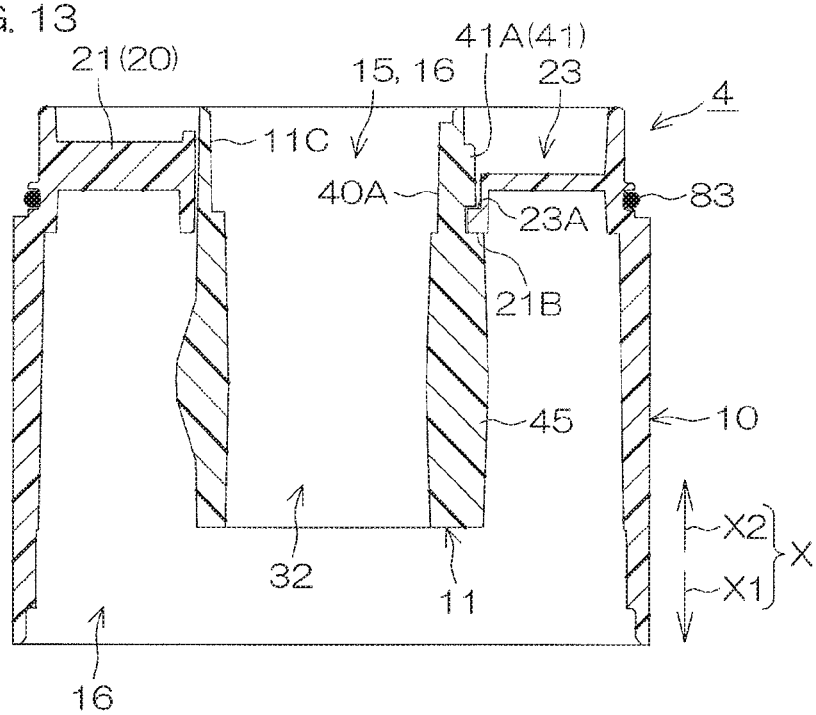
FIG. 13 is a sectional view taken along a line C-C in FIG. 12.
Figure 14:
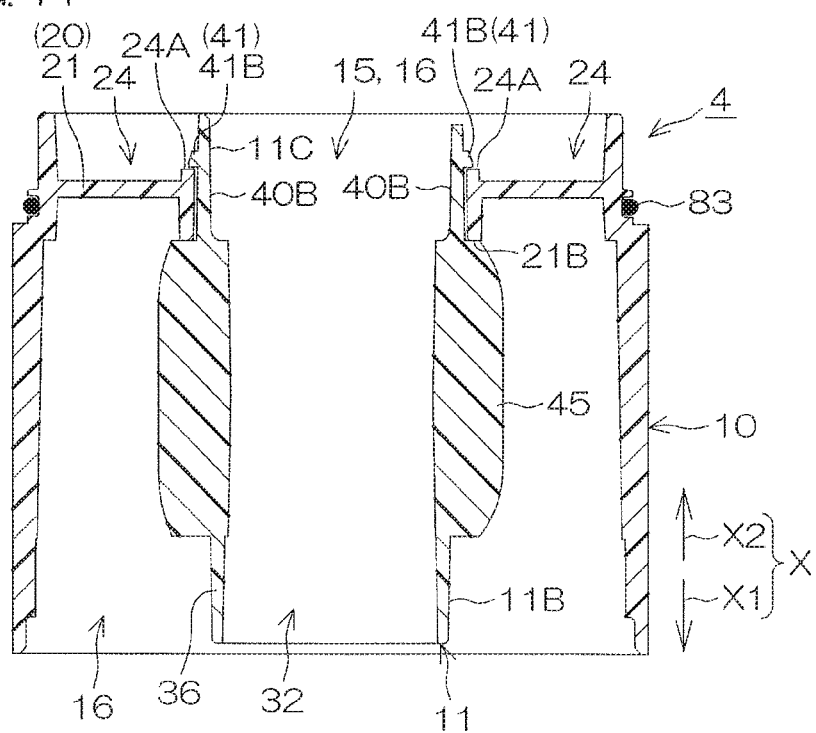
FIG. 14 is a sectional view taken along a line D-D in FIG. 12.

Referring to FIG. 13, which is a sectional view taken along a line C-C in FIG. 12, the first inner projections 41A respectively continuously abut against the first bottom surfaces 23A of the first recesses 23 from the other side X2 with the inner member 11 located at the first position. Referring to FIG. 14, which is a sectional view taken along a line D-D in FIG. 12, the second inner projections 41B respectively continuously abut against the bottom surfaces 24A of the second recesses 24 from the other side X2 with the inner member 11 located at the first position. In this state, the overhang portion 21 of the support portion 20 of the outer member 10 contacts the light guide members 45 of the inner member 11 from the other side X2.

Figure 15:
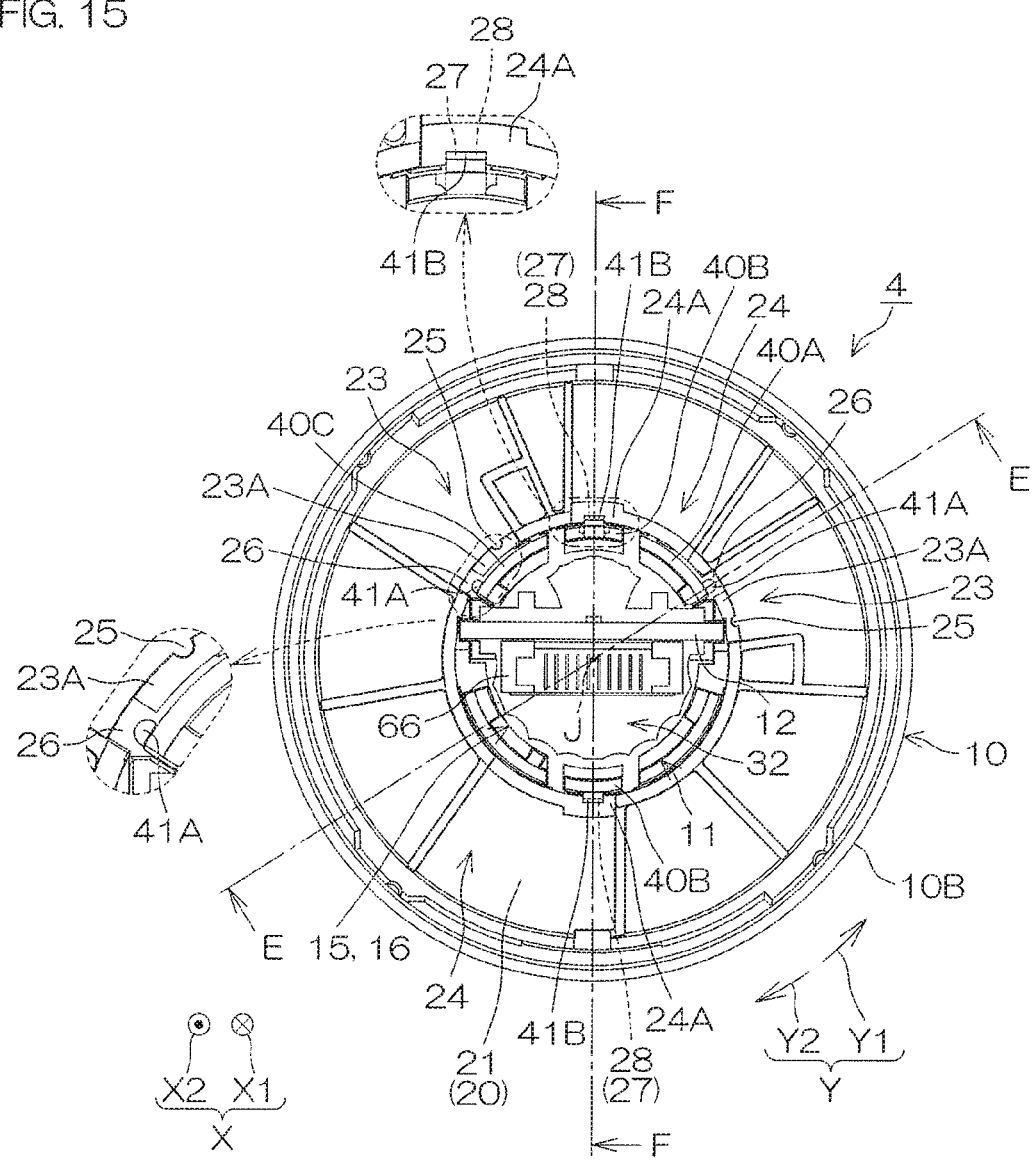
FIG. 15 is a schematic plan view of the stack unit with the inner member located at a second position.

When the inner member 11 is fully rotated relative to the outer member 10 from the first position about the rotation axis J in the first rotation direction Y1, the inner member 11 is returned to the second position shown in FIG. 15. The second position is away from the first position in the rotation direction Y. During the relative rotation of the inner member 11 to the second position, the first inner projections 41A are slid on the first bottom surfaces 23A of the first recesses 23 in abutment against the first bottom surfaces 23A from the other side X2. During the relative rotation of the inner member 11 to the second position, the second inner projections 41B are slid on the bottom surfaces 24A of the second recesses 24 in abutment against the bottom surfaces 24A from the other side X2.

With the inner member 11 located at the second position, the first inner projections 41A are respectively located at the ends (downstream ends) of the first recesses 23 with respect to the first rotation direction Y1 after riding over the outer projections 25. Therefore, the inner projections 41A are respectively disengaged from the outer projections 25. This permits the relative rotation of the inner member 11 so as not to prevent the rotation of the outer member 10 for connection between stack units 4. The rotation range of the inner member 11 corresponds to the dimensions of the first recesses 23 as measured in the rotation direction Y. The second inner projections 41B are respectively located at the ends (downstream ends) of the second recesses 24 with respect to the first rotation direction Y1 in alignment with the second guide grooves 27.

Figure 16:
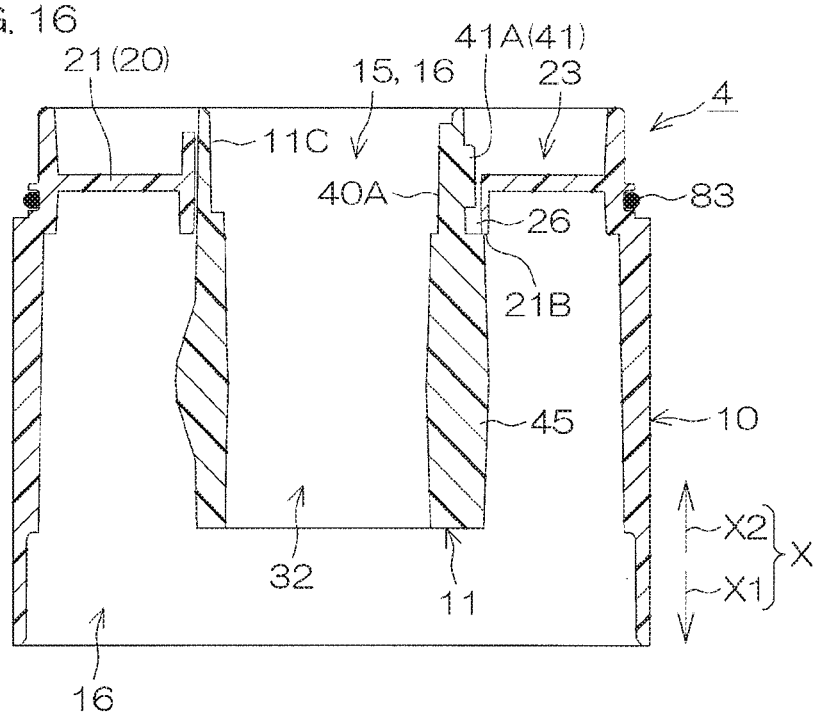
FIG. 16 is a sectional view taken along a line E-E in FIG. 15.
Figure 17:
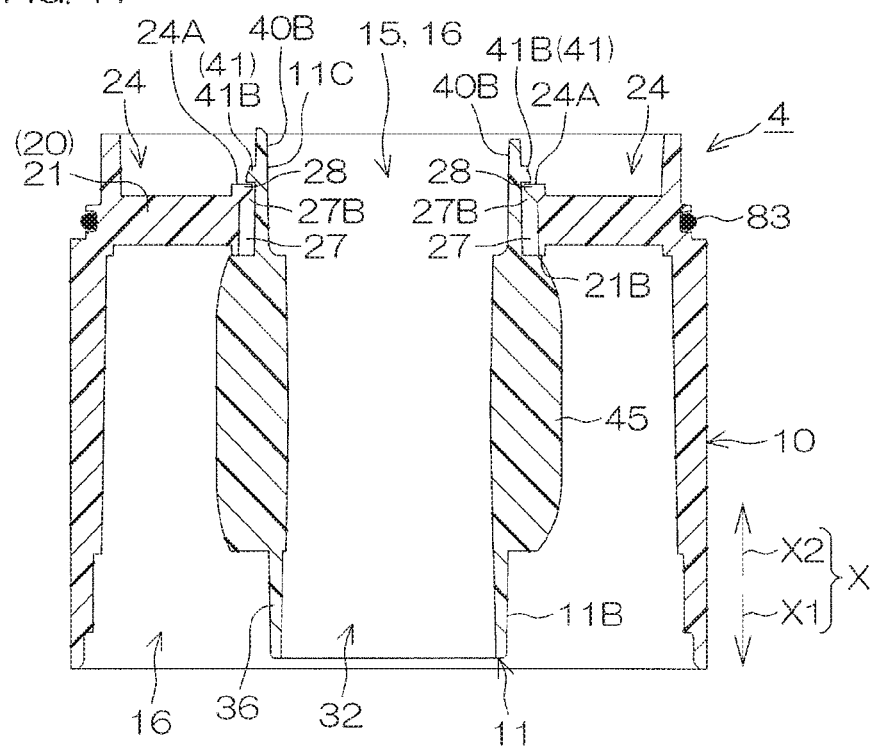
FIG. 17 is a sectional view taken along a line F-F in FIG. 15.

Referring to FIG. 16, which is a sectional view taken along a line E-E in FIG. 15, the first inner projections 41A of the inner projections 41 are respectively aligned with the first guide grooves 26 with the inner member 11 located at the second position to be thereby brought out of abutment against the overhang portion 21 in the stacking direction X. Referring to FIG. 17, which is a sectional view taken along a line F-F in FIG. 15, the second inner projections 41B respectively continuously abut against the bottom surfaces 24A of the second recesses 24, i.e., the closure portions 28, from the other side X2 with the inner member 11 located at the second position. In this state, the overhang portion 21 of the support portion 20 of the outer member 10 continuously contacts the light guide members 45 of the inner member 11 from the other side X2.

With the inner member 11 located at the second position, the first inner projections 41A are respectively moved toward the one side X1 in the first guide grooves 26, and the second inner projections 41B are respectively moved to ride over the closure portions 28 and then moved toward the one side X1 in the second guide grooves 27. Thus, the inner member 11 can be disengaged from the first internal space 15 of the outer member 10 to the one side X1. As described above, the inner member 11 can be mounted in the first internal space 15 from the one side X1 by reversing the procedure employed for the disengagement of the inner member 11. When the first inner projections 41A pass over the first guide grooves 26 and the second inner projections 41B ride over the closure portions 28 in the mounting of the inner member 11 in the first internal space 15, the inner member 11 is located at the second position.

As described above, the inner member 11 is rotatable relative to the outer member 10 between the first position and the second position. With respect to the overhang portion 21 of the support portion 20 of the outer member 10, the first bottom surfaces 23A of the first recesses 23 and the bottom surfaces 24A of the second recesses 24 are engaged with the inner projections 41 of the inner member 11 from the one side X1, and the overhang portion 21 is engaged with the light guide members 45 of the inner member 11 from the other side X2. That is, the support portion 20 supports the inner member 11 so that the inner member 11 is rotatable relative to the outer member 10 about the rotation axis J and immovable relative to the outer member 10 in the stacking direction X. The relative immovability herein means that the inner member 11 is not inadvertently disengaged from the outer member 10 in the stacking direction X. Therefore, the inner member 11 may be supported by the support portion 20 with a certain play in the stacking direction X.

As described above, the stack unit 4 includes the outer member 10, the inner member 11 disposed in the first internal space 15 of the outer member 10, and the board 12 held in the second internal space 32 of the inner member 11. Thus, the stack unit 4 has a simplified construction with a reduced number of components. This reduces the assembling time of the stack unit 4.

Where the stack unit 4 is present alone, the inner member 11 is located at the first position. In this case, the first inner projections 41A of the inner projection 41 are respectively engaged with the outer projections 25 provided on the inner surface 10A of the outer member 10, whereby the inner member 11 is temporarily locked for prevention of inadvertent rotation thereof (see FIG. 12).

Next, how to stack a first stack unit 4A and a second stack unit 4B in the stacking direction X and connect these stack units 4 together in FIG. 1 will be described. First, the second stack unit 4B is located on the other side X2 of the first stack unit 4A. Then, these stack units 4 are positioned relative to each other with respect to the rotation direction Y so that the first grooves 18A of the first connection portions 18 of the outer member 10 of the second stack unit 4B are respectively aligned with the second connection portions 19 of the outer member 10 of the first stack unit 4A with respect to the rotation direction Y (see FIG. 2). A linear mark 80, for example, extending in the stacking direction X may be provided on the outer circumferential surface 10B of the outer member 10 at a single position defined with respect to the rotation direction Y. In this case, when the first stack unit 4A and the second stack unit 4B are properly positioned relative to each other with respect to the rotation direction Y, the marks 80 on the stack units 4 are aligned with each other with respect to the rotation direction Y. Thus, it is confirmed that the positioning is completed.

Figure 18:
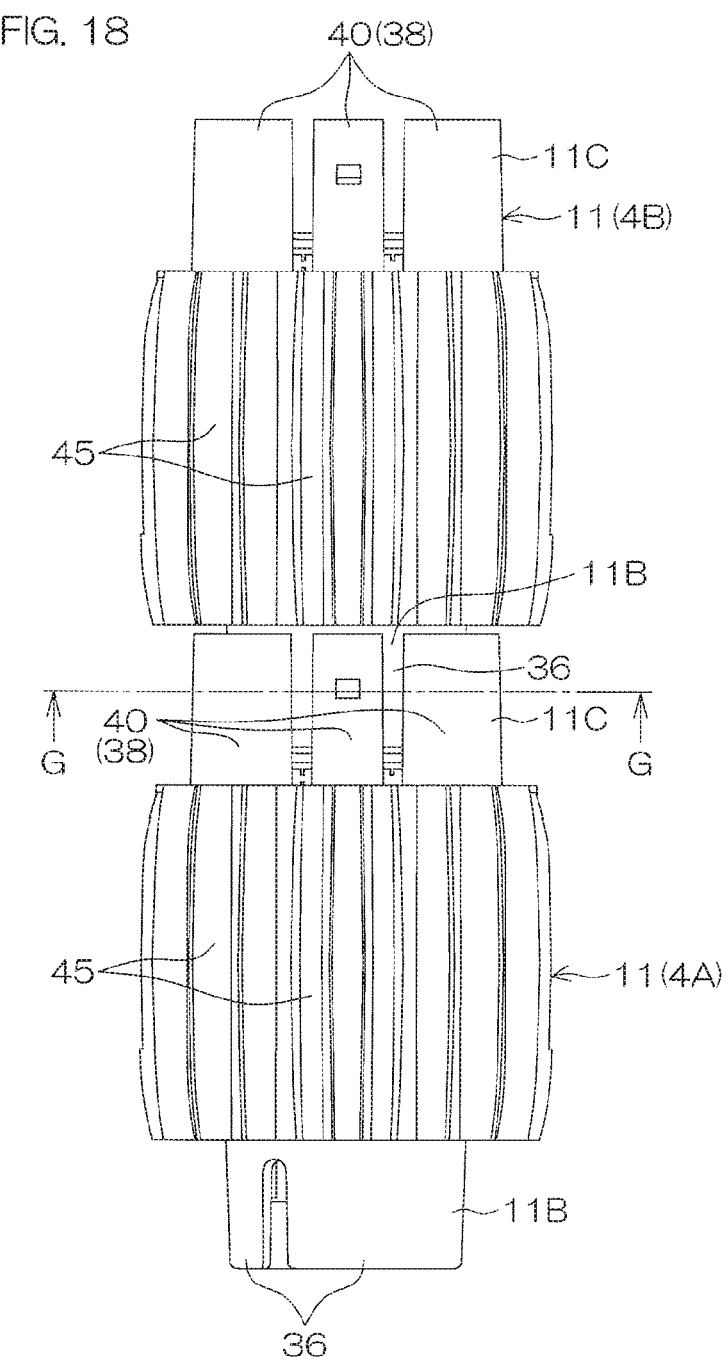
FIG. 18 is a side view of two inner members connected to each other.
Figure 19:
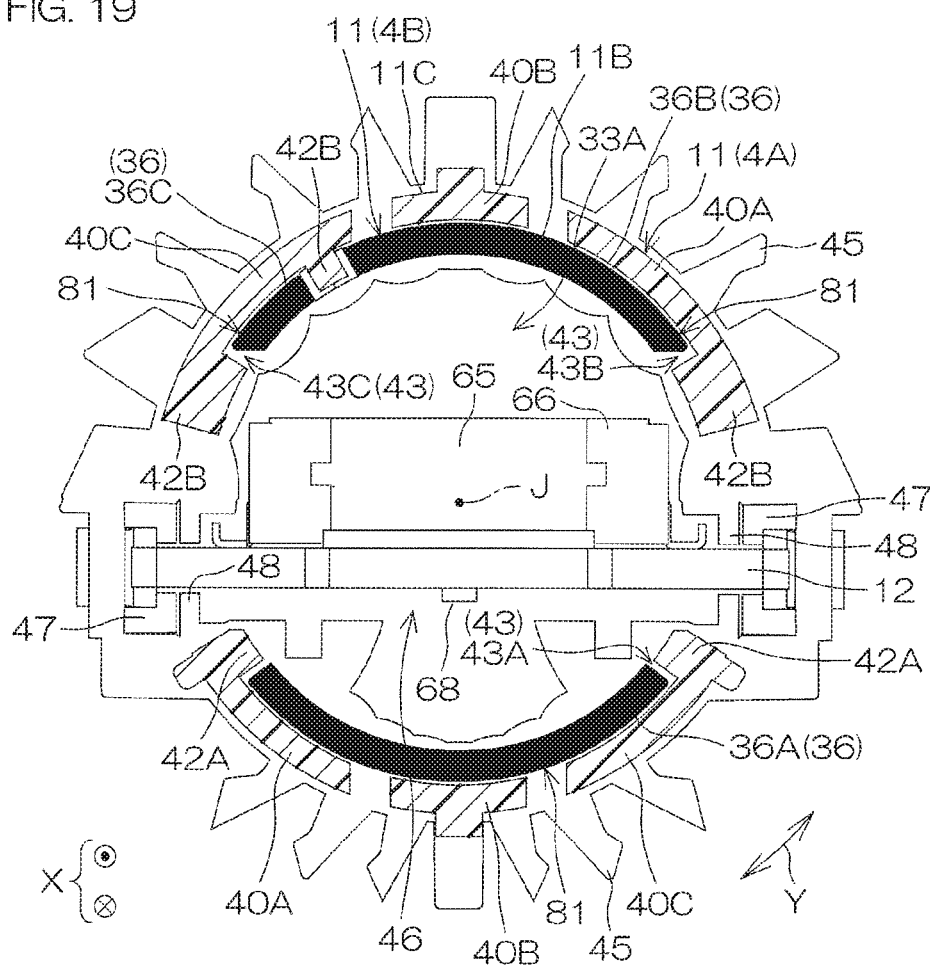
FIG. 19 is a sectional view taken along a line G-G in FIG. 18.

FIG. 18 is a side view of the inner members 11 of the two stack units 4 connected to each other. FIG. 19 is a sectional view taken along a line G-G in FIG. 18. In FIG. 19, the one-side engagement portions 36 of the inner member 11 are blacked out for convenience of description. With the positioning of the first stack unit 4A and the second stack unit 4B thus completed, as described above, the first other-side engagement portion 43A of the inner member 11 of the first stack unit 4A is aligned with the first one-side engagement portion 36A of the inner member 11 of the second stack unit 4B with respect to the rotation direction Y. The second other-side engagement portion 43B of the inner member 11 of the first stack unit 4A is aligned with the second one-side engagement portion 36B of the inner member 11 of the second stack unit 4B with respect to the rotation direction Y.

Further, the third other-side engagement portion 43C of the inner member 11 of the first stack unit 4A is aligned with the third one-side engagement portion 36C of the inner member 11 of the second stack unit 4B with respect to the rotation direction Y.

With the positioning thus completed, the first stack unit 4A and the second stack unit 4B are relatively moved toward each other in the stacking direction X. Thus, the smaller diameter portion 10C of the outer member 10 of the first stack unit 4A is inserted into the one-side (X1) first opening 16A of the outer member 10 of the second stack unit 4B from the one side X1 (see FIG. 2). At this time, the second connection portions 19 of the first stack unit 4A respectively advance into the first grooves 18A of the first connection portions 18 of the second stack unit 4B toward the other side X2. At the same time, as shown in FIG. 19, the other-side end portion 11C of the inner member 11 of the first stack unit 4A is fitted around the one-side end portion 11B of the inner member 11 of the second stack unit 4B from the one side X1. At this time, the first other-side engagement portion 43A of the first stack unit 4A receives the first one-side engagement portion 36A in the stacking direction X, and the second other-side engagement portion 43B of the first stack unit 4A receives the second one-side engagement portion 36B in the stacking direction X. Further, the third other-side engagement portion 43C of the first stack unit 4A receives the third one-side engagement portion 36C in the stacking direction X. That is, the other-side engagement portions 43 of the first stack unit 4A respectively receive the one-side engagement portions 36 of the second stack unit 4B in the stacking direction X.

The first ribs 42A, the second ribs 42B, the first one-side engagement portion 36A, the second one-side engagement portion 36B and the third one-side engagement portion 36C constitute a restriction portion 81. The restriction portion 81 connects the inner members 11 of the first stack unit 4A and the second stack unit 4B provided adjacent each other by the engagement between the other-side engagement portions 43 of the first stack unit 4A and the one-side engagement portions 36 of the second stack unit 4B. More specifically, the adjacent first ribs 42A respectively abut against opposite ends of the first one-side engagement portion 36A, whereby the movement of the first one-side engagement portion 36A about the rotation axis J is restricted. Further, the adjacent second ribs 42B respectively abut against opposite ends of the second one-side engagement portion 36B and opposite ends of the third one-side engagement portion 36C, whereby the movement of the second one-side engagement portion 36B and the third one-side engagement portion 36C about the rotation axis J is restricted. This restricts the relative rotation of the inner members 11 about the rotation axis J. Thus, the inner members 11 can be positioned with respect to the rotation direction Y about the rotation axis J. The other-side engagement portions 43 are capable of respectively receiving the one-side engagement portions 36 having sizes corresponding to the trench widths W thereof (see FIG. 5). This prevents erroneous insertion of the one-side engagement portions 36 in the other-side engagement portions 43, making it possible to accurately position the inner members 11 of the adjacent stack units 4 with respect to the rotation direction Y. The one-side engagement portions 36 and the other-side engagement portions 43 thus connected together may be entirely regarded as the restriction portion 81.

Figure 20:
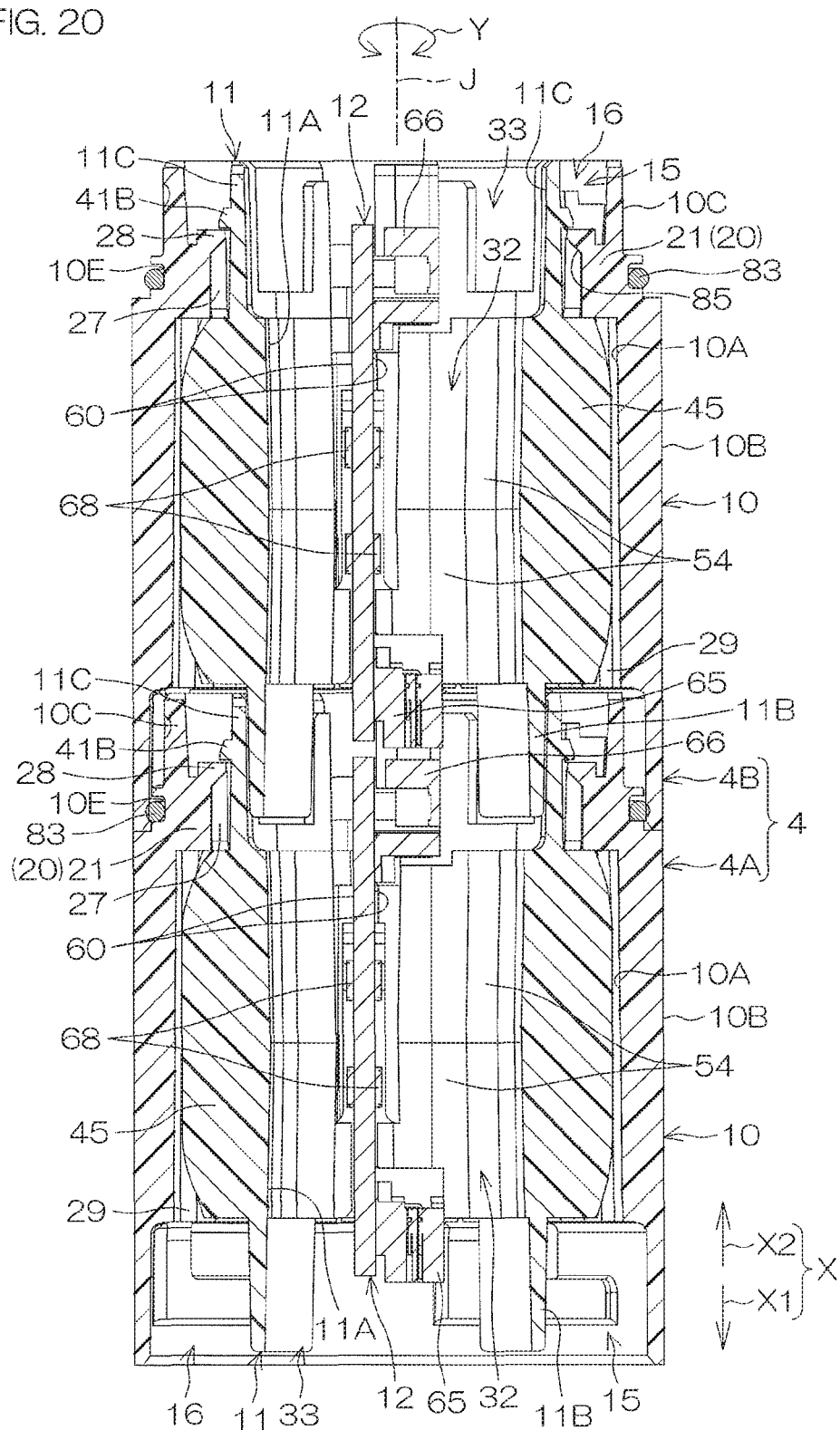
FIG. 20 is a vertical sectional view of two stack units connected to each other and disposed upright.

FIG. 20 is a vertical sectional view of the two stack units connected to each other and disposed upright. After the inner members 11 are connected together, the first connector 65 of the second stack unit 4B is engaged in the recess 66A of the second connector 66 of the first stack unit 4A from the other side X2, and the pins 67 of the second connector 66 are respectively inserted into the insertion holes 65B provided in the end face 65A of the first connector 65 from the one side X1 (see FIG. 11). Thus, the second connector 66 of the first stack unit 4A and the first connector 65 of the second stack unit 4B are electrically and mechanically connected to each other. Since the inner members 11 are connected to each other before the connection between the first connector 65 and the second connector 66, breakage of these connectors can be prevented which may otherwise occur when the connectors are brought into contact with the inner members 11.

Before the first connector 65 and the second connector 66 are connected together, the inner members 11 of the first stack unit 4A and the second stack unit 4B are each located at the first position. Therefore, the second connector 66 of the first stack unit 4A can be aligned with the first connector 65 of the second stack unit 4B with respect to the rotation direction Y and, in this state, smoothly connected to each other. The first connector 65 and the second connector 66 may be slightly movable on the board 12 like a so-called floating connector so that a difference in relative position with respect to the rotation direction Y between the first stack unit 4A and the second stack unit 4B can be accommodated to some extent.

Referring to FIG. 2, when the first stack unit 4A and the second stack unit 4B are relatively moved in the stacking direction X and the second connection portions 19 reach the other-side (X2) end portions of the first grooves 18A, the second connection portions 19 cannot further advance toward the other side X2. In this state, the outer members 10 of the first stack unit 4A and the second stack unit 4B are relatively rotated about the rotation axis J so that the second stack unit 4B is offset from the first stack unit 4A in the second rotation direction Y2. Thus, the second connection portions 19 of the first stack unit 4A are respectively transferred from the first grooves 18A to the second grooves 18B of the first connection portions 18 of the second stack unit 4B, and respectively advance in the first rotation direction Y1 in the second grooves 18B. The outer circumferential surfaces 10B of the outer members 10 of the stack units 4 may be each provided with a mark 82 indicating the rotation direction of the outer member 10 for the connection (see FIG. 1).

As the outer members 10 are rotated relative to each other, the inner members 11 of the first stack unit 4A and the second stack unit 4B connected together are rotated relative to the outer members 10 from the first position to the second position with the boards 12 respectively held therein. When the linear projections 18C respectively provided in the second grooves 18B of the first connection portions 18 are respectively fitted in the notches 19A of the second connection portions 19, the relative rotation of the first stack unit 4A and the second stack unit 4B is stopped.

In this state, the second connection portions 19 of the first stack unit 4A are respectively engaged with the first connection portions 18 of the second stack unit 4B. Therefore, the second connection portions 19 are respectively positioned in the second grooves 18B to be thereby immovable in the stacking direction X, and immovable in the rotation direction Y with the linear projections 18C respectively fitted in the notches 19A. Thus, the outer members 10 of the first stack unit 4A and the second stack unit 4B are connected to each other by the connection portion 17 so as to be immovable in the stacking direction X as well as the rotation direction Y. In this state, the marks 80 of the stack units 4 are offset from each other in the rotation direction Y (see FIG. 1). As described above, the first stack unit 4A and the second stack unit 4B can be connected to each other by only two easy motions such as the relative movement thereof in the stacking direction X and the relative rotation thereof in the rotation direction Y without the use of a tool. The first stack unit 4A and the second stack unit 4B can be easily disconnected from each other by reversing the procedure employed for the connection of the stack units.

The inner members 11 are rotatable relative to the outer members 10 with the boards 12 respectively held therein. Therefore, when the outer members 10 are rotated about the rotation axis J for the connection or the disconnection of the adjacent stack units 4 via the connection portions 17 thereof, the rotation of the outer members 10 is not transmitted to the inner members 11 respectively holding the boards 12. Therefore, even if the boards 12 of the adjacent stack units 4 are connected to each other via the first connector 65 and the second connector 66 respectively provided on the boards 12 to thereby restrict the rotation of the inner members 11, the boards 12 are prevented from being twisted by the rotation of the outer members 10.

The base unit 2 is provided with a connection portion 17 described above (second connection portions 19 in this embodiment), and the head cover 3 is also provided with a connection portion 17 described above (first connection portions 18 in this embodiment). The base unit 2 and the first stack unit 4A are connected together, and the head cover 3 and the second stack unit 4B are connected together by the same procedure as employed for the connection between the first stack unit 4A and the second stack unit 4B via the connection portions 17, whereby the signal indicator lamp 1 is completed as shown in FIG. 1. The first connector 65 of the first stack unit 4A is connected to a connector (not shown) provided in the base unit 2. Thus, electric power is supplied from the power supply board (not shown) incorporated in the base unit 2 to the boards 12 of the first stack unit 4A and the second stack unit 4B. Further, control signals are transmitted from the control board (not shown) incorporated in the base unit 2 to the boards 12 of the first stack unit 4A and the second stack unit 4B.

Referring to FIG. 20, the light sources 68 provided on the major surfaces 60 of the boards 12 of the first stack unit 4A and the second stack unit 4B thereby emit light beams in a predetermined light emitting pattern. The outer members 10 and the inner members 11 of the stack units 40 are transparent or translucent, and light-transmissive. Therefore, the light beams emitted from the light sources 68 are incident on the inner surfaces 11A of the inner members 11 into the inner members 11 and radially spread through the light guide members 45, and then outputted from the outer circumferential surfaces 10B of the outer members 10 to the outside of the stack units 4 through the outer members 10. The stack units 4 each function as a display unit for providing predetermined information by the light beams. The lens portions 54 on the inner surfaces 11A of the inner members 11 and the lens portions 29 on the inner surfaces 10A of the outer members 10 function to spread the light beams throughout the region along the rotation direction Y.

The stack units 4 have the same construction, but at least one of the outer member 10 and the inner member 11 of one of the stack units 4 may be colored differently from that of the other stack unit 4 so that the stack units 4 emit different color light beams. Alternatively, the stack units 4 may be constructed by employing different color light sources 68 for the stack units 4 while imparting the outer members 10 and the inner members 11 thereof with the same color.

A packing 83 such as an O-ring is fitted in the groove 10E of the smaller diameter portion 10C of the outer member 10 of each of the stack units 4. Since the packing 83 of the first stack unit 4A seals a gap defined between the smaller diameter portion 10C of the outer member 10 of the first stack unit 4A and the outer member 10 of the second stack unit 4B, water is prevented from intruding into the stack units 4 through the gap.

The present invention is not limited to the embodiment described above, but various modifications may be made within the scope of the present invention defined by the following claims.

For example, the stack unit 4 may be a buzzer unit which includes a buzzer for sounding an alarm, or a communication unit which has a communication function for communication with an external device, rather than the display unit described above.

The first connector 65 provided on the board 12 may be a connector having a pattern formed on the board 12, such as a so-called edge connector. In this case, the second connector 66 is a socket which receives the first connector 65. An inlet of the second connector 66 into which the first connector 65 is inserted is located in a position overlapping with the board 12 as seen in the stacking direction X in association with the first connector 65.

The components of the signal indicator lamp 1 may each have chamfers 85 provided on necessary portions thereof for preventing the components from being caught during the assembling of the signal indicator lamp 1 (see FIGS. 1 to 20).

In the above description, the expressions "relative movement" and "relative rotation" are intended to include a case in which two components are both moved and a case in which one of two components is kept stationary and only the other component is moved.

REFERENCE SIGNS LIST

1: SIGNAL INDICATOR LAMP
4: STACK UNIT
4A: FIRST STACK UNIT
4B: SECOND STACK UNIT
10: OUTER MEMBER
10A: INNER SURFACE
11: INNER MEMBER
11B: ONE-SIDE END PORTION
11C: OTHER-SIDE END PORTION
11E: OUTER SURFACE
12: BOARD
12B: END PORTION
12C: END PORTION
15: FIRST INTERNAL SPACE
16: FIRST OPENING
17: CONNECTION PORTION
20: SUPPORT PORTION
21: OVERHANG PORTION
25: OUTER PROJECTION
26: FIRST GUIDE GROOVE
27: SECOND GUIDE GROOVE
27B: OTHER-SIDE END
28: CLOSURE PORTION
32: SECOND INTERNAL SPACE
33: SECOND OPENING
36: ONE-SIDE ENGAGEMENT PORTION
41: INNER PROJECTION
41A: FIRST INNER PROJECTION
41B: SECOND INNER PROJECTION
43: OTHER-SIDE ENGAGEMENT PORTION
60: MAJOR SURFACE
65: FIRST CONNECTOR
66: SECOND CONNECTOR
68: LIGHT SOURCE
81: RESTRICTION PORTION
J: ROTATION AXIS
S: OPPOSITION DIRECTION
W: TRENCH WIDTH
X: STACKING DIRECTION
X2: OTHER SIDE
Y: ROTATION DIRECTION

The invention claimed is:

1. A stack unit for a signal indicator lamp including a plurality of such stack units stacked in a predetermined stacking direction, the stack unit comprising:
   an outer member having a first internal space and a pair of first openings through which the first internal space is open to opposite sides defined with respect to the stacking direction;
   a connection portion provided on the outer member for connecting the outer member to another stack unit of the signal indicator lamp by rotating the outer member about a rotation axis extending in the stacking direction;
   an inner member provided in the first internal space and having a second internal space and a pair of second openings through which the second internal space is open to the opposite sides defined with respect to the stacking direction;
   a support portion provided on the outer member for supporting the inner member so that the inner member is rotatable relative to the outer member about the rotation axis and immovable relative to the outer member in the stacking direction;
   a board having a pair of parallel major surfaces and held in the second internal space by the inner member with the major surfaces extending in the stacking direction;
   a first connector provided at an end of the board on one of the opposite sides defined with respect to the stacking direction for external electrical connection; and
   a second connector provided at an end of the board on the other side defined with respect to the stacking direction for external electrical connection.

2. The stack unit according to claim 1,
   wherein the outer member and the inner member are light-transmissive,
   the stack unit further comprising a light source provided on the major surfaces of the board.

3. The stack unit according to claim 2,
   wherein the inner member is a hollow cylindrical member having a center axis defined by the rotation axis,
   wherein the board is offset from the rotation axis in a direction perpendicular to the rotation axis.

4. The stack unit according to claim 3, further comprising a restriction portion having a one-side engagement portion provided in an end portion of the inner member on the one side and an other-side engagement portion provided in an end portion of the inner member on the other side for restricting relative rotation of the inner members of adjacent stack units of the signal indicator lamp about the rotation axis with the other-side engagement portion of one of the adjacent stack units in engagement with the one-side engagement portion of the other stack unit.

5. The stack unit according to claim 2, further comprising a restriction portion having a one-side engagement portion provided in an end portion of the inner member on the one side and an other-side engagement portion provided in an end portion of the inner member on the other side for restricting relative rotation of the inner members of adjacent stack units of the signal indicator lamp about the rotation axis with the other-side engagement portion of one of the adjacent stack units in engagement with the one-side engagement portion of the other stack unit.

6. The stack unit according to claim 2, wherein opposite end portions of the inner member defined with respect to the stacking direction partly project outward of the first connector and the second connector in the stacking direction.

7. The stack unit according to claim 1,
wherein the inner member is a hollow cylindrical member having a center axis defined by the rotation axis,
wherein the board is offset from the rotation axis in a direction perpendicular to the rotation axis.

8. The stack unit according to claim 7,
wherein at least one of the first connector and the second connector is located in a position overlapping with the rotation axis in the second internal space.

9. The stack unit according to claim 8, further comprising a restriction portion having a one-side engagement portion provided in an end portion of the inner member on the one side and an other-side engagement portion provided in an end portion of the inner member on the other side for restricting relative rotation of the inner members of adjacent stack units of the signal indicator lamp about the rotation axis with the other-side engagement portion of one of the adjacent stack units in engagement with the one-side engagement portion of the other stack unit.

10. The stack unit according to claim 7, further comprising a restriction portion having a one-side engagement portion provided in an end portion of the inner member on the one side and an other-side engagement portion provided in an end portion of the inner member on the other side for restricting relative rotation of the inner members of adjacent stack units of the signal indicator lamp about the rotation axis with the other-side engagement portion of one of the adjacent stack units in engagement with the one-side engagement portion of the other stack unit.

11. The stack unit according to claim 1, further comprising a restriction portion having a one-side engagement portion provided in an end portion of the inner member on the one side and an other-side engagement portion provided in an end portion of the inner member on the other side for restricting relative rotation of the inner members of adjacent stack units of the signal indicator lamp about the rotation axis with the other-side engagement portion of one of the adjacent stack units in engagement with the one-side engagement portion of the other stack unit.

12. The stack unit according to claim 11,
wherein the one-side engagement portion includes a plurality of projections each extending in the stacking direction,
wherein the other-side engagement portion includes a plurality of trenches each extending in the stacking direction for respectively receiving the projections of the one-side engagement portion of the other stack unit,
wherein the trenches have different trench widths.

13. The stack unit according to claim 1, wherein opposite end portions of the inner member defined with respect to the stacking direction partly project outward of the first connector and the second connector in the stacking direction.

14. The stack unit according to claim 1,
wherein the inner member has an inner projection projecting from an outer surface thereof,
wherein the support portion has an overhang portion projecting into the first internal space from an inner surface of the outer member defining the first internal space and adapted to be engaged with the inner projection in the stacking direction.

15. The stack unit according to claim 8, wherein the inner projection abuts against the overhang portion in the stacking direction, and is slidable with respect to the overhang portion during the relative rotation of the inner member.

16. The stack unit according to claim 15,
wherein the inner projection includes a first inner projection,
wherein the outer member includes an outer projection provided on the inner surface thereof and projecting into the first internal space,
wherein the inner member is rotatable relative to the outer member between a first position at which the first inner projection and the outer projection are engaged with each other and a second position at which the first inner projection and the outer projection are disengaged from each other, the second position being away from the first position in the rotation direction about the rotation axis.

17. The stack unit according to claim 16,
wherein the outer member has a first guide groove extending through the overhang portion in the stacking direction,
wherein the first inner projection is aligned with the first guide groove with the inner member being located at the second position.

18. The stack unit according to claim 17,
wherein the inner projection includes a second inner projection different from the first inner projection,
wherein the overhang portion includes:
a second guide groove provided away from the first guide groove in the rotation direction and extending in the stacking direction for receiving and guiding the second inner projection when the inner member is inserted into the first internal space in the stacking direction; and
a closure portion which closes an end of the second guide groove on a downstream side defined with respect to an insertion direction in which the inner member is inserted into the first internal space, and is engaged with the second inner projection from the downstream side when the second inner projection reaches the end of the second guide groove and rides on the closure portion.

19. A signal indicator lamp comprising the stack unit according to claim 1.

20. A signal indicator lamp comprising a first stack unit, and a second stack unit stacked on the first stack unit in a stacking direction, the first and second stack units each being the stack unit according to claim 1,
wherein the first stack unit and the second stack unit are connected to each other via the connection portions thereof by relative rotation of the outer members of the first stack unit and the second stack unit about the rotation axes,
wherein the second connector of the first stack unit and the first connector of the second stack unit are connected to each other.

* * * * *